US010083213B1

(12) United States Patent
Podgorny et al.

(10) Patent No.: US 10,083,213 B1
(45) Date of Patent: *Sep. 25, 2018

(54) METHOD AND SYSTEM FOR ROUTING A QUESTION BASED ON ANALYSIS OF THE QUESTION CONTENT AND PREDICTED USER SATISFACTION WITH ANSWER CONTENT BEFORE THE ANSWER CONTENT IS GENERATED

(71) Applicant: Intuit Inc., Mountain View, CA (US)

(72) Inventors: Igor A. Podgorny, San Diego, CA (US); Matthew Cannon, San Diego, CA (US); Todd Frey Goodyear, San Diego, CA (US); Kelvin Hung, San Diego, CA (US)

(73) Assignee: Intuit Inc., Mountain View, CA (US)

(*) Notice: Subject to any disclaimer, the term of this patent is extended or adjusted under 35 U.S.C. 154(b) by 269 days.

This patent is subject to a terminal disclaimer.

(21) Appl. No.: 14/697,108

(22) Filed: Apr. 27, 2015

(51) Int. Cl.
*G06F 7/00* (2006.01)
*G06F 17/30* (2006.01)

(52) U.S. Cl.
CPC .... *G06F 17/3053* (2013.01); *G06F 17/30864* (2013.01)

(58) Field of Classification Search
CPC .......... G06F 17/3053; G06F 17/30864; G06F 17/30398; G06F 3/0237; G06F 19/36; G06F 19/363

(Continued)

(56) References Cited

U.S. PATENT DOCUMENTS 5,471,382 A * 11/1995 Tallman ................. G06F 19/325
  128/920
5,519,608 A * 5/1996 Kupiec ................ G06F 17/3064
  704/9

(Continued)

FOREIGN PATENT DOCUMENTS

CN   101520802    4/2009
EP   2159715      3/2010
WO   WO 2011/053830  5/2011

OTHER PUBLICATIONS

Bartolome et al., "Processing Unstructured Voice of Customer Feedback for Improving Content Rankings in Customer Support Systems," U.S. Appl. No. 15/094,653, filed Apr. 8, 2016.

(Continued)

*Primary Examiner* — Mohammed R Uddin
(74) *Attorney, Agent, or Firm* — Hawley Troxell Ennis & Hawley LLP; Philip McKay

(57) ABSTRACT

A question and answer based customer support system is provided through which users submit question data representing questions to be answered using support resources. Low quality and/or high quality question formats are defined and questions having a low quality question format are labeled improperly formatted questions, while questions having a high quality question format are labeled properly formatted questions. Received question data is analyzed to determine if the question data represents an improperly or properly formatted question before allocating support resources to generating an answer. If, a determination is made that the question data represents an improperly formatted question, corrective actions are taken before allocating support resources to generating an answer. If a determination is made that the question data represents a properly formatted question, the question represented by the question (Continued)

| TYPE/FORMAT OF QUESTION | OCCURRENCE PERCENTAGE (%) | SATISFIED WITH ANSWER (%) |
|---|---|---|
| CLOSED-ENDED (Yes/No or Multpile choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 | data is allocated support resources to generate an answer on a priority basis.

21 Claims, 14 Drawing Sheets

(58) Field of Classification Search
USPC .................. 707/728, 713, 771, 708, 999.003
See application file for complete search history.

(56) References Cited

U.S. PATENT DOCUMENTS

| | | | |
|---|---|---|---|
| 6,147,975 A | | 11/2000 | Bowman-Amuah |
| 7,013,263 B1 | | 3/2006 | Isaka et al. |
| 7,222,078 B2 * | | 5/2007 | Abelow ................. 705/1.1 |
| 7,385,716 B1 * | | 6/2008 | Skaanning ......... G06F 11/0733 358/1.14 |
| 7,594,176 B1 | | 9/2009 | English |
| 7,685,144 B1 | | 3/2010 | Katragadda |
| 7,974,860 B1 | | 7/2011 | Travis |
| 8,943,145 B1 | | 1/2015 | Peters et al. |
| 9,015,031 B2 * | | 4/2015 | Ferrucci ............. G06F 17/2785 704/7 |
| 9,063,983 B1 * | | 6/2015 | Lee ...................... G06F 17/3051 |
| 9,582,757 B1 * | | 2/2017 | Holmes .................... G06N 5/02 |
| 9,633,309 B2 * | | 4/2017 | Giffels ................. G06F 17/271 |
| 2002/0111926 A1 * | | 8/2002 | Bebie ...................... G06N 5/04 706/45 |
| 2002/0123983 A1 | | 9/2002 | Riley et al. |
| 2002/0169595 A1 * | | 11/2002 | Agichtein ........... G06F 17/2705 704/9 |
| 2003/0099924 A1 | | 5/2003 | Tsuboi et al. |
| 2004/0024739 A1 | | 2/2004 | Copperman et al. |
| 2005/0114327 A1 * | | 5/2005 | Kumamoto ....... G06F 17/30684 |
| 2007/0011131 A1 * | | 1/2007 | Delefevre ......... G06F 17/30864 |
| 2007/0259325 A1 | | 11/2007 | Clapper |
| 2008/0215541 A1 | | 9/2008 | Li et al. |
| 2008/0294637 A1 * | | 11/2008 | Liu .................... G06F 17/30861 |
| 2009/0012926 A1 * | | 1/2009 | Ishikawa ........... G06F 17/30654 706/47 |
| 2009/0162824 A1 * | | 6/2009 | Heck ...................... G06Q 10/10 434/322 |
| 2009/0248659 A1 | | 10/2009 | McCool et al. |
| 2009/0253112 A1 | | 10/2009 | Cao et al. |
| 2009/0265340 A1 | | 10/2009 | Barcklay et al. |
| 2010/0068687 A1 | | 3/2010 | Bertelsen |
| 2010/0070554 A1 * | | 3/2010 | Richardson ............ G06Q 10/06 709/202 |
| 2010/0076998 A1 | | 3/2010 | Podgorny et al. |
| 2010/0185630 A1 | | 7/2010 | Cheng et al. |
| 2010/0191686 A1 | | 7/2010 | Wang et al. |
| 2010/0203492 A1 | | 8/2010 | Nibe et al. |
| 2010/0205550 A1 * | | 8/2010 | Chen ...................... G06Q 30/02 715/760 |
| 2010/0235361 A1 * | | 9/2010 | Chandran ............. G06Q 30/02 707/748 |
| 2011/0125734 A1 * | | 5/2011 | Duboue .................... G09B 7/00 707/723 |
| 2011/0202472 A1 | | 8/2011 | Wan et al. |
| 2011/0231347 A1 | | 9/2011 | Xu et al. |
| 2011/0264569 A1 | | 10/2011 | Houseworth et al. |
| 2012/0005148 A1 | | 1/2012 | Horvitz et al. |
| 2012/0005219 A1 * | | 1/2012 | Apacible ........... G06F 17/30675 707/768 |
| 2012/0022983 A1 | | 1/2012 | Hughes et al. |
| 2012/0084293 A1 * | | 4/2012 | Brown ...................... A61B 5/00 707/741 |
| 2012/0130910 A1 | | 5/2012 | Al-Alami |
| 2012/0130978 A1 | | 5/2012 | Li et al. |
| 2012/0166438 A1 | | 6/2012 | Wu et al. |
| 2012/0219142 A1 * | | 8/2012 | Gould ................. H04M 3/5183 379/212.01 |
| 2012/0233191 A1 | | 9/2012 | Ramanujam |
| 2012/0331052 A1 | | 12/2012 | Rathod |
| 2013/0019286 A1 * | | 1/2013 | Barborak ................ G06F 17/27 726/4 |
| 2013/0066693 A1 | | 3/2013 | Laird-McConnell et al. |
| 2013/0073390 A1 | | 3/2013 | Konig et al. |
| 2013/0282363 A1 * | | 10/2013 | Fan ...................... G06F 17/2872 704/9 |
| 2013/0304730 A1 | | 11/2013 | Zhou |
| 2013/0325992 A1 | | 12/2013 | McGann et al. |
| 2013/0339870 A1 | | 12/2013 | Tandra Sishtla et al. |
| 2014/0006012 A1 * | | 1/2014 | Zhou ................. G06F 17/30654 704/9 |
| 2014/0088944 A1 | | 3/2014 | Natarajan et al. |
| 2014/0119531 A1 | | 5/2014 | Tuchman et al. |
| 2014/0189829 A1 | | 7/2014 | McLachlan et al. |
| 2014/0222669 A1 | | 8/2014 | Novak et al. |
| 2014/0308648 A1 | | 10/2014 | Jain |
| 2014/0316856 A1 | | 10/2014 | Williams et al. |
| 2014/0337257 A1 | | 11/2014 | Chatterjee et al. |
| 2015/0052087 A1 | | 2/2015 | Srinivasan et al. |
| 2015/0095267 A1 | | 4/2015 | Behere et al. |
| 2015/0120718 A1 * | | 4/2015 | Luo ................... G06F 17/30699 707/728 |
| 2015/0127587 A1 * | | 5/2015 | Pinckney ............. G06N 99/005 706/11 |
| 2015/0139415 A1 | | 5/2015 | Skiba et al. |
| 2015/0254785 A1 | | 9/2015 | Yang |
| 2015/0371137 A1 * | | 12/2015 | Giffels ................... G06N 5/02 706/46 |
| 2016/0048772 A1 | | 2/2016 | Bruno et al. |
| 2016/0055234 A1 * | | 2/2016 | Visotski ............ G06F 17/30719 707/728 |
| 2016/0103833 A1 * | | 4/2016 | Sanders ............ G06F 17/30867 707/723 |
| 2016/0189029 A1 | | 6/2016 | Giffels et al. |
| 2016/0196497 A1 | | 7/2016 | Allen et al. |
| 2016/0217472 A1 | | 7/2016 | Podgorny et al. |
| 2016/0283491 A1 * | | 9/2016 | Lu ...................... G06F 17/2785 |
| 2016/0306846 A1 | | 10/2016 | Adams, Jr. et al. |
| 2017/0032251 A1 | | 2/2017 | Podgorny et al. |
| 2017/0032468 A1 * | | 2/2017 | Wang ................... G06Q 40/123 |
| 2017/0124184 A1 | | 5/2017 | Podgorny et al. |
| 2018/0032890 A1 | | 2/2018 | Podgorny et al. |

OTHER PUBLICATIONS

Podgorny, et al., "Content Quality and User Ranking in TurboTax AnswerXchange," Proceedings of the European Conference on Social Media, University of Brighton UK, Jul. 10-11, 2014.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33rd Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

* cited by examiner

| | 101 | 102 | 103 |
|---|---|---|---|
| TYPE/FORMAT OF QUESTION | OCCURRENCE PERCENTAGE (%) | SATISFIED WITH ANSWER (%) |
| CLOSED-ENDED (Yes/No or Multpile choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 |

FIG. 1A

| MODEL ATTRIBUTE | WALD CHI-SQUARE |
|---|---:|
| "CLOSED-ENDED" TYPE | (+) 339 |
| "WHY" TYPE | (−) 317 |
| REPORTING A PROBLEM | (−) 180 |
| "HOW" TYPE | (−) 105 |
| INTENT TO CALL/CHAT | (−) 104 |
| SUBJECT LENGTH | (+) 87 |
| SOFTWARE RELATED | (−) 77 |
| PERSONAL PRONOUN "YOU" | (−) 75 |
| INTENT TO PRINT TAX RETURN | (−) 66 |
| QUESTION MARK IN QUESTION | (+) 59 |

FIG. 1C

Ask a multiple-choice question (recommended):

Can, are, do, does, if, is, should, will...

Answer choices:
⦿ Yes or No
◯ Let me specify...

—or—

Ask an open-ended question:

Where, what, when, who, how...

FIG. 2A

QUESTION OPTIMIZER

Get better answers!
Can you rephrase "Why can't I print?"

BEST: Ask it as a multiple choice question

Can, are, do, does, if, is, should, will, which...

Be concise. You can add details next    15 more characters required

Answer choices:
This will help you get the answer you need,
but will not prevent people from adding detailed answers.
◉ Yes or No
○ Let me specify...

GOOD: Ask it as an open-ended question

Where, what, when, who, how...

Be concise. You can add details next    15 more characters required

Skip | Submit optimized question

Brandname Support        ProductLink | Sign Out

Let's get you an answer
Our Question Optimizer™ gets you the best community answers, fast.

201

203

① Ask your question
Use at least 15 characters and 3 words.

❝❝ WHY CANT I DEDUCT  215

Try asking your question a different way
207

170

[ Next Step ]  [ Analyze ]

② Check for questions like yours

③ Add details to your question

B  *I*  U   ≔  ≣  ≔  ≔

| Question Optimizer™  204 |
|---|
| Get the best answers with these tips! |
| You must finish with a question mark. Clearly written questions get the best answers!  218 |
| You must used mixed case.  219 ALL CAPS is harder to read, and it may appear like shouting, which is a turn-off to potential respondants. |
| Avoid open-ended questions.  220 Yes/no or multiple-choice questions receive more answers. Consider asking: can, are, do, does, if, is should, will, which. |
| Avoid asking why.  221 These questions can be hard to answer. Try asking how, where, can, are, do, does, if, is, should, will or which. |
| View more tips |

202 intuit

Home | Tags | Terms of Use | Privacy | Send Us Feedback

© 2014 Intuit, Inc. All rights reserved.

Figure 2E:
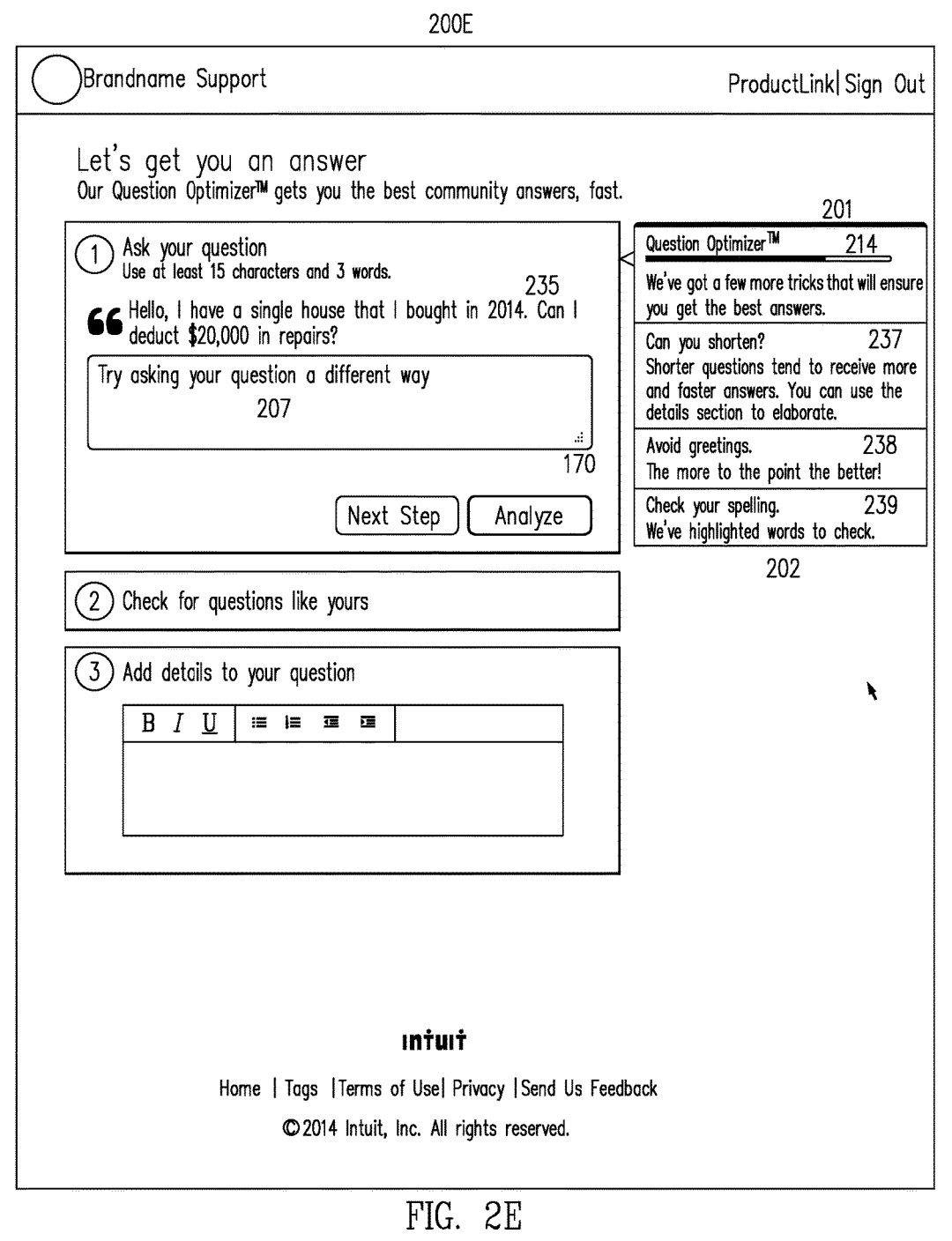

◯ Brandname Support                                    ProductLink| Sign Out

Let's get you an answer
Our Question Optimizer™ gets you the best community answers, fast.

201

① Ask your question
Use at least 15 characters and 3 words.
235
❝ Hello, I have a single house that I bought in 2014. Can I deduct $20,000 in repairs?

Try asking your question a different way
207

170

[ Next Step ]  [ Analyze ]

| Question Optimizer™ 214 |
| We've got a few more tricks that will ensure you get the best answers. |
| Can you shorten? 237 |
| Shorter questions tend to receive more and faster answers. You can use the details section to elaborate. |
| Avoid greetings. 238 |
| The more to the point the better! |
| Check your spelling. 239 |
| We've highlighted words to check. |

202

② Check for questions like yours

③ Add details to your question

B  *I*  U  | ≡ ≣ ≣ ≣ intuit

Home | Tags | Terms of Use| Privacy | Send Us Feedback
© 2014 Intuit, Inc. All rights reserved.

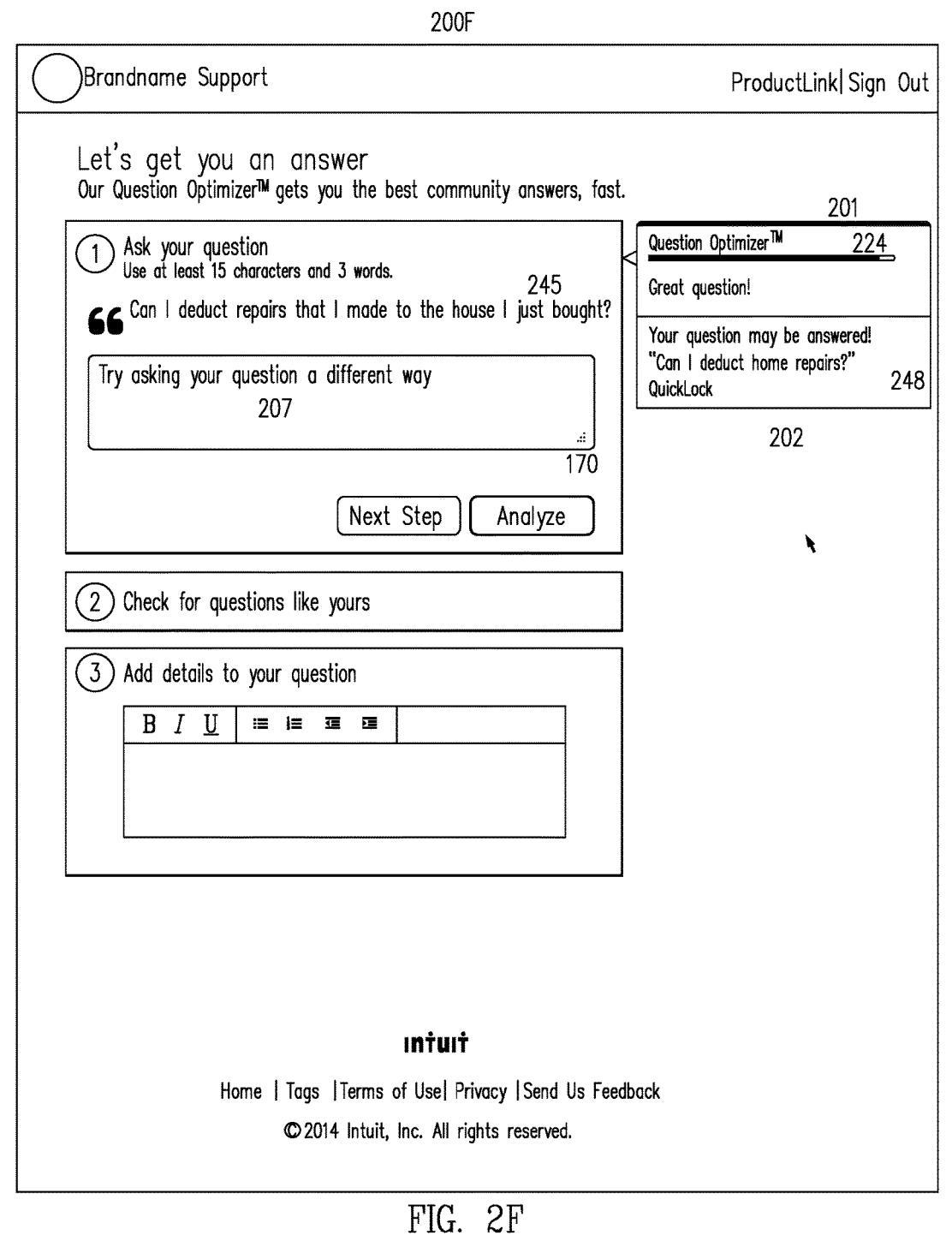

◯ Brandname Support      ProductLink| Sign Out

Let's get you an answer
Our Question Optimizer™ gets you the best community answers, fast.

① Ask your question
Use at least 15 characters and 3 words.
                                      245
❝ Can I deduct repairs that I made to the house I just bought?

[ Try asking your question a different way
                       207 ]
                                     170

[ Next Step ] [ Analyze ]

201
Question Optimizer™    224
Great question!

Your question may be answered!
"Can I deduct home repairs?"
QuickLock            248
                 202

② Check for questions like yours

③ Add details to your question
B  *I*  U    ≡ ≡ ≡ ≡ intuit

Home | Tags | Terms of Use | Privacy | Send Us Feedback
© 2014 Intuit, Inc. All rights reserved.

FIG. 2F

METHOD AND SYSTEM FOR ROUTING A QUESTION BASED ON ANALYSIS OF THE QUESTION CONTENT AND PREDICTED USER SATISFACTION WITH ANSWER CONTENT BEFORE THE ANSWER CONTENT IS GENERATED

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which an asking user can direct their specific questions, typically in a text format, to a support community that often includes other users and/or professional agent support personnel.

In many cases, once an asking user's specific question is answered by members of the support community through the question and answer based customer support system, the asking user's specific question, and the answer to the specific question provided by the support community, is categorized and added to a customer support question and answer database associated with the question and answer based customer support system. In this way, subsequent searching users, i.e., a user accessing previously generated question and answer pairs, of the software system can access the asking users' specific questions or topics, and find the answer to the asking users' questions, via a search of the customer support question and answer database. As a result, a dynamic customer support question and answer database of categorized/indexed asking users questions and answers is made available to searching users of the software system through the question and answer based customer support system.

The development of customer support question and answer databases has numerous advantages including a self-help element whereby a searching user can find an answer to their particular question by simply searching the customer support question and answer database for topics, questions, and answers related to their issue previously submitted by asking users. Consequently, using a question and answer based customer support system including a customer support question and answer database, potentially millions of user questions can be answered in an efficient and effective manner, and with minimal duplicative effort.

Using currently available question and answer based customer support systems, once an asking user's question is answered, the asking user is provided the opportunity to rate the answer with respect to how helpful the answer was to the asking user. In addition, searching users in the user community are provided the opportunity to rate accessed question and answer pair content based on how helpful the answer was to them. In this way, feedback is provided with respect to a given question and answer pair, and answers with low satisfaction ratings, i.e., poorly rated answers, can eventually be identified by this feedback. In addition, this feedback data is also often used to determine/rank which question and answer pair, or pairs, to provide a searching user in response to question content submitted by the searching user.

Using traditional customer support question and answer databases, when a searching user submits a question, e.g., submits question data, to the customer support question and answer database, the customer support question and answer database is searched to determine if the question currently being asked has been answered before. Typically, if a determination is made that the question currently being asked, or a sufficiently similar question, has been answered before, the searching user is then provided one or more answers previously provided to the previously submitted questions determined to be the same as, or sufficiently similar to, the question currently being asked. Typically the searching user is then provided results data representing one or more previously asked question and answer pairs.

In addition, it often happens that there are multiple previously answered questions substantially identical to, or sufficiently similar to, the question currently being asked. As a result, there are often multiple previously generated answers related to the question currently being asked. In these cases, a determination must be made as to which previously answered question and answer pair, or pairs, are most likely to provide the current searching user with an answer to the current question being asked that will result in the highest probability of the searching user being satisfied with the answer provided, i.e., a previously answered question and answer pair must be chosen that is most likely to result in user satisfaction with the answer provided.

Using traditional customer support question and answer databases, the determination as to which previously answered question and answer pair, or pairs, are most likely to result in the searching user being satisfied with the answer provided is made largely, if not entirely, based on the feedback data, or ranking data, associated with the previously answered question and answer pair data provided by the original asking user and/or subsequent searching users as discussed above. As a result, using current question and answer based customer support systems, and their associated customer support question and answer databases, poorly rated, or low quality/value question and answer pair data is only removed reactively, after it has potentially been viewed by multiple users, and often a large number of searching users.

In addition, the determination as to which previously answered question and answer pair, or pairs, are most likely to result in the searching user being satisfied with the answer can only be made reactively after feedback data, or ranking data, associated with the previously answered question and answer pair data is provided by the original asking user and/or subsequent searching users. This is particularly problematic because until feedback data, or ranking data, regarding previously answered question and answer pair data is received from a significant number of users, the determination as to which previously answered question and answer pair, or pairs, are most likely to result in the searching user being satisfied with the answer can only be made on, at best, likely skewed and inaccurate data.

Consequently, by the time poorly rated question and answer pair data is identified and ranked by receipt of a threshold number of low satisfaction ratings, such as a "down vote," or a threshold number of high satisfaction ratings, such as an "up vote," not only is the initial asking user potentially dissatisfied with the answer content, and often with the software system itself, but searching users, and often numerous additional searching users, are also potentially dissatisfied with the previously answered question and answer pair data provided to them in response to their currently submitted question data. This then leads to the searching users becoming dissatisfied with the support provided, and the software system itself. In addition, these current methods for ranking question and answer pair content and identifying low quality/value question and answer pair data are based on the assumption that the asking and searching users will not only provide feedback, but that they will provide feedback that is objective and logical, e.g., not based on emotion or frustration; often, this is simply not the case.

The above situation presents several challenges to the providers of question and answer based customer support systems, and their associated customer support question and answer databases. These challenges are partially significant given that a customer support question and answer database is usually a critical, if not the most important, feature of a question and answer based customer support system. This is because there is, by definition, a finite number of support resources, such as, for example, support personnel, either volunteers or professionals, and, therefore, there is a limit to the amount of support resources, such as support person-hours, available at any time to answer user questions. Consequently, it is important to utilize support resources, such as a support community, efficiently to answer not only just new questions, and thereby avoid redundant efforts, but to answer questions that are likely to result in satisfied users first, as opposed to questions that are unlikely to satisfy either the asking user or subsequent searching users.

One important consideration in developing an effective and efficient question and answer based customer support system, and an associated customer support question and answer database, is the need to provide a customer support question and answer database having as much, and as varied, question and answer pair data as possible, as soon as possible. That is to say, the providers of question and answer based customer support systems, and their associated customer support question and answer databases, need to develop question and answer pair data representing as large a number of different question and answer pairs as they can to maximize the capability to answer as many potential questions as possible without resorting to utilizing the limited number of support personnel or other support resources. To achieve this goal, the support resources, such as a support community, must be used to first answer numerous questions that are new. Consequently, in order to develop, and/or dynamically adapt, the customer support question and answer database, the support resources, such as volunteer and professional agent support personnel of the support community, must initially be heavily be utilized.

However, it is at least equally important to ensure the question and answer pair data is high quality/high value question and answer pair data, i.e., that the resulting question and answer pair content is likely to result in both asking and searching user satisfaction with the answer/assistance offered through the question and answer pair data. In short, it is highly desirable to ensure that the support resources, such as volunteer and professional agent support personnel of the support community, are utilized to provide is high quality/high value question and answer pair data associated with as many varied question types in as short a time as possible.

As noted above, to most efficiently utilize support resources, such as volunteer and professional agent support personnel of a support community, it is desirable to focus those support resources on submitted questions that are new question types to avoid redundant effort. Most traditional customer support question and answer databases make some effort to this end. However, it is equally important to ensure support resources, such as volunteer and professional agent support personnel of a support community, are utilized to answer questions that are likely to not only provide the asking user with an answer that will result in the asking user being satisfied with the answer content provided, but that are also likely to be useful to other searching users, and result in these searching users being satisfied with the answer content provided. That is to say, it is equally important to ensure the support resources, such as volunteer and professional agent support personnel of a support community, are focused on generating high quality/high value question and answer pair content. In this way, the use of the support resources, such as volunteer and professional agent support personnel of a support community, will yield more positive results and a customer support question and answer database will be developed, and/or dynamically adapted, to provide higher quality answer content predicted to provide a greater number of users with answer content meeting their needs.

Despite this long standing need, traditional question and answer based customer support systems typically do not address the issue discussed above. This is largely because, as noted above, using traditional question and answer based customer support systems, analysis of question and answer data is largely preformed reactively only after the answer data has been generated, and after the support resources, such as volunteer and professional agent support personnel of a support community, have been devoted to answering the question. Consequently, using traditional question and answer based customer support systems, precious support resources, such as volunteer and professional agent support personnel time, are often devoted to low quality/low value questions, while high quality/high value questions wait to be answered, and therefore are delayed before being added to the customer support question and answer database where other searching users can access the question and answer pair content.

In addition, to make matters worse, it is often the case that much more precious support resources, such as volunteer and professional agent support personnel time, are wasted trying to answer a low quality/low value question than would be required to answer a high quality/high value question. That is to say, ironically, as a general rule, it takes longer and more effort to produce low quality/low value question and answer pair data than to produce high quality/high value question and answer pair data. Worse yet, the longer time devoted to trying to answer the low quality/low value questions is often completely wasted because, by definition, neither the asking or searching users are likely to be satisfied with the answer data provided. Indeed, by providing answer data unlikely to result in satisfied users, it is arguable the provider of the software system is devoting a disproportionate amount of precious support resources to an endeavor that, at best, will provide no positive result, and often results in poor user ratings and dissatisfaction with the software system itself.

Clearly, the situation described above represents a significant issue and a long standing problem for question and answer based customer support systems and software system providers. This is because user satisfaction with the question and answer based customer support systems is not only critical to the effectiveness of the question and answer based customer support systems, but also to the satisfaction and reputation of the software system and the software system provider. As a result of the situation described above, currently, both users and providers of software systems, and question and answer based customer support systems of all types, are denied the full potential of the question and answer based customer support systems. Consequently, the technical fields of information dissemination, customer support, feedback utilization and integration, software implementation and operation, and user experience are detrimentally affected.

What is needed is a method and system for reliably, efficiently, and proactively predicting user satisfaction with a potential answer to a user's question and then routing and prioritizing the user's question to support resources, such as volunteer and/or professional agent support personnel of a support community, such that those questions predicted to result in high user satisfaction with any answer data generated are provided to the support resources, such as the proper support personnel, in a priority manner, while those questions predicted to result in low user satisfaction with any answer data generated are subjected to one or more corrective actions before being submitted to any support resources, such as support personnel, or are at least given a lower priority for submission to the support resources, such as proper support personnel. In this way, the satisfaction of asking and/or searching users with question and answer pair data to be potentially provided through the question and answer based customer support system can be predicted to ensure support resources, such as the time and energy of support personnel, are utilized most efficiently and the resulting question and answer pair data is of the highest quality/value.

SUMMARY

Embodiments of the present disclosure address some of the shortcomings associated with traditional question and answer based customer support systems by focusing initial analysis on the question being asked by the user before routing the question to support resources, such as, but not limited to, proper support personnel, and before any specific answer data is generated, or provided to any users. In this way, the question itself is analyzed and questions determined to be high quality/high value, or of relatively higher quality/value, are provided to the support resources, such as, but not limited to, proper support personnel, on a priority basis, while questions of a low quality/low value, or of relatively lower quality/value, are, in one embodiment proactively modified, before any support resources are devoted to the question, or are at least allocated support resources, such as, but not limited to, proper support personnel time, on a lower priority basis.

In one embodiment, a process for allocating support resources to a question based on analysis of the question content and predicted user satisfaction with answer content before the answer content is generated includes providing a software system to one or more users.

In one embodiment, the users of the software system are provided a question and answer based customer support system through which question data can be entered by the users. In one embodiment, the users of the software system submit the question data representing questions to potentially be provided to one or more support resources associated with the question and answer based customer support system so that the questions represented by the question data can be answered via answer data generated using the support resources.

In one embodiment, low quality and/or high quality question formats are defined and questions having a low quality question format are labeled improperly formatted questions, while questions having a high quality question format are labeled properly formatted questions.

In one embodiment, question data is received representing a question submitted by a user through the question and answer based customer support system. In one embodiment, before allocating support resources to generating answer data related to the question data, the question data is analyzed to determine if the question represented by the question data represents an improperly or properly formatted question.

In one embodiment, if, based on the analysis of the question data, a determination is made that the question data represents an improperly formatted question, one or more corrective actions are taken before allocating support resources to generating answer data related to the question data.

In one embodiment, if, based on the analysis of the question data, a determination is made that the question data represents an improperly formatted question, the question represented by the question data is allocated support resources to generate answer data related to the question data on a low priority basis.

In contrast, in one embodiment, if, based on the analysis of the question data, a determination is made that the question data represents a properly formatted question, the question represented by the question data is allocated support resources to generate answer data related to the question data on a high priority basis.

In one embodiment, the method and system for allocating support resources to a question based on analysis of the question content and predicted user satisfaction with answer content before the answer content is generated includes performing pre-question submission parsing of the question data and analysis of the attributes, subject matter, and format of the question itself, to determine what type of resources should be devoted to the question and to predict user satisfaction with answer data that may eventually be provided through the question and answer based customer support system; before any support resources are devoted to the question and before answer data is generated or provided to any user. This paradigm shifting approach to predicting user satisfaction with answer content based on the user's question alone, and, in one embodiment, providing question modification guidance, before routing the question and/or allocating support resources to the question, and before the answer is generated, is in direct contrast to prior art assumptions and approaches that focused entirely on analysis of the answer data provided after both the question and answer had already been formulated, and support resources were utilized in an attempt to answer the question.

In one embodiment, using the disclosed method and system for allocating support resources to a question based on analysis of the question content and predicted user satisfaction with answer content before the answer content is generated, questions being entered into the question and answer based customer support system are parsed and analyzed.

In one embodiment, the questions being entered into the question and answer based customer support system are parsed and analyzed to determine the content of the question being asked and/or the type of question being asked. In one embodiment, based on this analysis, an initial determination is made as to how to initially route the question and what type of support resources should be allocated to the question.

As one example, if based on this analysis, a determination is made that the question is a subject matter question directed to the subject matter and/or an area of endeavor of the software system that is addressed using the parent software system, the question is determined to need allocation of volunteer support personnel time. In contrast, in this specific illustrative example, if a determination is made that the question is a product related question directed to the purchase, installation, or general operation of the parent software system, the question is determined to need allocation of professional agent support personnel time.

In one embodiment, the questions being entered into the question and answer based customer support system are parsed and analyzed to identify questions likely to result in answer data that will satisfy either an asking user, i.e., a user submitting a question, and/or subsequent searching users, i.e., users accessing the resulting question and answer pair data through a customer support question and answer database, In short, the questions are analyzed to identify high quality questions having a high quality question format likely to result in high quality/high value question and answer pair data. In one embodiment, high quality questions are labeled properly formatted questions having desirable question data.

In one embodiment, identified properly formatted questions are then allocated support resources, such as, but not limited to, the time of volunteer and professional agent support personnel of a support community, on a high priority basis in an effort to provide answer content to both the asking user and/or searching users, through a customer support question and answer database, on a high priority basis.

In one embodiment, the questions being entered into the question and answer based customer support system are parsed and analyzed to identify questions not likely to result in answer data that will satisfy either an asking user, i.e., a user submitting a question, and/or subsequent searching users, i.e., users accessing the resulting question and answer pair content through a customer support question and answer database. In short, the questions are analyzed to identify low quality questions having a low quality question format likely to result in low quality/low value question and answer pair data. In one embodiment, low quality questions are labeled improperly formatted questions having undesirable question data.

In one embodiment, identified improperly formatted questions are then allocated support resources, such as, but not limited to, the time of volunteer and professional agent support personnel of a support community, on a low priority basis in an effort to provide answer data to both the asking user and/or searching users, through a customer support question and answer database, on a low priority basis, if at all.

In one embodiment, identified improperly formatted questions are subjected to one or more corrective actions. In one embodiment, the corrective actions include, but are not limited to: filtering out the question from the question and answer based customer support system, with no support resources being allocated to the improperly formatted question; dropping the question out of the question and answer based customer support system entirely; only allocating support resources on a low priority basis after all properly formatted questions have been allocated support resources; and/or attempting to modify transform the improperly formatted question into a properly formatted question.

In one embodiment, identified improperly formatted questions are analyzed and potential modifications to the attributes, subject matter, and format of the question that will transform the undesirable improperly formatted question data into desirable properly formatted question data that is more likely to result in high quality/high value question and answer pair data that will satisfy either an asking user, and/or subsequent searching users, are identified. In one embodiment, the asking user is then provided one or more sample re-worded questions and/or question re-wording guidelines, representing the potential modifications necessary to transform the undesirable improperly formatted question data into desirable properly formatted question data that provides a higher probability of user satisfaction with any answer data eventually provided.

In one embodiment, the format transformation/question reformation instructions used to transform an improperly formatted question into a properly formatted question are generated by parsing and dynamically analyzing the format of the user's question as submitted; in one embodiment, as the question is being formed/created and entered into the question and answer based customer support system. In short, in one embodiment, as a user is entering question data, the question data is parsed and the attributes, subject matter, and format of the question itself is analyzed as discussed herein to identify improperly formatted questions having low quality question formats. If improperly formatted questions are identified, the users are provided format transformation/question reformation instructions and/or suggestions on how to re-phrase/reform the improperly formatted questions. In one embodiment, these format transformation/question reformation instructions and/or suggestions are further customized to the user based on the user's own historical data and/or user profile data. Consequently, the format transformation/question reformation instructions and/or suggestions provided are customized to both the specific question being asked and, in one embodiment, individual user attributes identified using the user's own historical data and/or user profile data.

In one embodiment, the format transformation/question reformation instructions for transforming the improperly formatted question into a properly formatted question are customized to the specific question being submitted, the user's historical data, and/or the user's profile data in relative real-time. In one embodiment, the format transformation/question reformation instructions for transforming the improperly formatted question into a properly formatted question are customized to the specific question being submitted, the user's historical data, and/or the user's profile data in relative real-time through a question transformation user interface screen that includes a question quality indicator, such as, but not limited to, a question quality score, meter, or other visual or audio aide. In various embodiments, the question quality indicator provides the user with relatively real time feedback regarding the quality of the question being submitted as question data representing the question is being submitted and/or modified.

In one embodiment, when, and if, an improperly formatted question and the undesirable question data is transformed into a properly formatted question and desirable question data, the now properly formatted question and desirable question data is allocated support resources, such as, but not limited to, the time of volunteer and professional agent support personnel of a support community, on a high priority basis in an effort to provide answer content to both the asking user and/or searching users, through a customer support question and answer database, on a high priority basis.

As noted above, a customer support question and answer database is a critical, if not the most important, feature of a question and answer based customer support system. This is because there is, by definition, a finite number of support resources, such as, for example, support personal, either volunteers or professionals, and, therefore, there is a limit to the amount of support resources, such as support person-hours, available at any time to answer user questions. Consequently, it is important to utilize support resources, such as a support community, efficiently to answer not only just new questions, and thereby avoid redundant efforts, but to answer questions that are likely to result in satisfied users first, as opposed to questions that are unlikely to satisfy either the asking user or subsequent searching users.

Using the concepts disclosed herein, satisfaction with the answers provided through a question and answer based customer support system are predicted before the question is formally submitted to the question and answer based customer support system. Therefore, using the concepts disclosed herein, methods and systems are provided to reliably, efficiently, and proactively predict user satisfaction with a potential answer to a user's question and then route and prioritize the user's question to support resources, such as volunteer and/or professional agent support personnel of a support community, such that those questions predicted to result in high user satisfaction with any answer data generated are provided to the support resources, such as the proper support personnel, in a priority manner, while those questions predicted to result in low user satisfaction with any answer data generated are subjected to one or more corrective actions before being submitted to any support resources, such as support personnel, or are at least given a lower priority for submission to the support resources, such as proper support personnel.

In this way, the satisfaction of asking and/or searching users with question and answer pair data to be potentially provided through the question and answer based customer support system can be predicted to ensure support resources, such as the time and energy of support personnel, are utilized most efficiently and the resulting question and answer pair data is of the highest quality/value.

The disclosed method and system for allocating support resources to a question based on analysis of the question content and predicted user satisfaction with answer content before the answer content is generated provides for significant improvements to the technical fields of customer support, information dissemination, software implementation, and user experience. In addition, using the disclosed method and system for allocating support resources to a question based on analysis of the question content and predicted user satisfaction with answer content before the answer content is generated results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for allocating support resources to a question based on analysis of the question content and predicted user satisfaction with answer content before the answer content is generated disclosed herein.

BRIEF DESCRIPTION OF THE DRAWINGS

FIG. 1A shows a table of results data obtained through analysis of actual questions submitted to a question and answer based customer support system indicating question types, the frequency of the question types as a percentage of questions asked, and ranking of the question types by up vote fraction;

FIG. 1C is a table of results data obtained through analysis of actual questions submitted to a question and answer based customer support system showing the Wald Chi-square statistics for the top subject attributes of an asking user vote prediction model;

FIG. 2A is an illustrative example of a first question transformation interface screen used to provide users format transformation/question reformation instructions that direct users in transforming improperly formatted questions into properly formatted closed-ended questions in accordance with one embodiment;

FIG. 2B is an illustrative example of a second question transformation interface screen used to provide users format transformation/question reformation instructions and using a question optimizer approach to direct users towards transforming improperly formatted questions into properly formatted questions in accordance with one embodiment;

FIGS. 2D, 2E, and 2F together are an illustrative example of a set of question transformation interface screens used to provide users format transformation/question reformation instructions that direct a user in transforming an improperly formatted question into properly formatted question and including a visual question quality indicator which provides a simple read of question-quality in accordance with one specific illustrative example of embodiment;

Figure 1B:
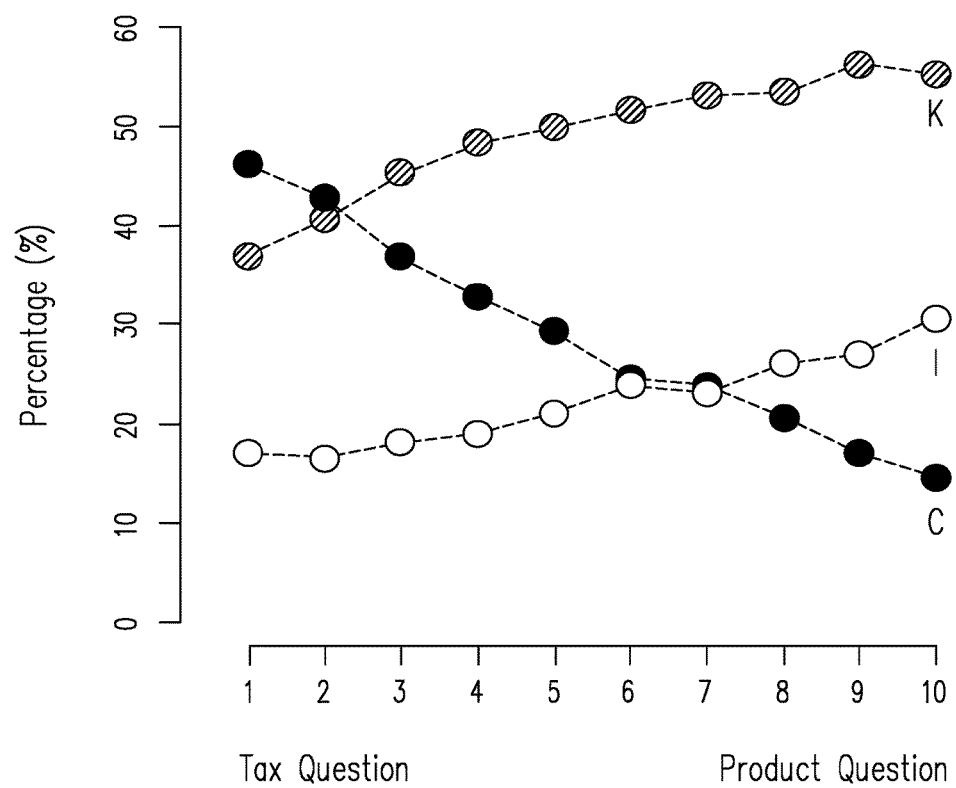
FIG. 1B is a graph of results data obtained through analysis of actual questions submitted to a question and answer based customer support system showing the discovered relationship between "subject matter questions," "product related questions," and the category of question asked.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "question transformation user interface screen" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "question quality indicator" includes any mechanism, means, or feature/function provided to indicate to a user a determined quality of a question being provided by the user. Specific examples of question quality indicators include, but are not limited to, meter displays; line displays; score displays; audio content; visual content; images; backgrounds; avatars; highlighting mechanisms; icons; and any other features that individually, or in combination, relay to a user a determined quality of a question being submitted.

Herein, the term "party," "user," "user consumer," and "customer" are used interchangeably to denote any party and/or entity that interfaces with, and/or to whom information is provided by, the method and system for allocating support resources to a question based on analysis of the question content and predicted user satisfaction with answer content before the answer content is generated described herein, and/or a person and/or entity that interfaces with, and/or to whom information is provided by, the method and system for allocating support resources to a question based on analysis of the question content and predicted user satisfaction with answer content before the answer content is generated described herein, and/or a legal guardian of person and/or entity that interfaces with, and/or to whom information is provided by, the method and system for allocating support resources to a question based on analysis of the question content and predicted user satisfaction with answer content before the answer content is generated described herein, and/or an authorized agent of any party and/or person and/or entity that interfaces with, and/or to whom information is provided by, the method and system for allocating support resources to a question based on analysis of the question content and predicted user satisfaction with answer content before the answer content is generated described herein. For instance, in various embodiments, a user can be, but is not limited to, a person, a commercial entity, an application, a service, and/or a computing system.

As used herein, the term "asking user" includes a user of a software system submitting a question to a question and answer based customer support system.

As used herein, the term "searching user" includes a user of a software system submitting a search query to a customer support question and answer database associated with a question and answer based customer support system.

As used herein, the term "support community for the software system" includes unpaid users, paid agents, or other support personnel who operate through software system and that are used as support resources for generating answer data associated with user submitted question data.

As used herein, the term "volunteer support personnel of a support community for the software system" includes unpaid users or other support personnel who operate through a support community for the software system and that are used as support resources for generating answer data associated with user submitted question data. As a specific example, volunteer support personnel of a support community for the software system include "super users" and other volunteer support personnel certified by a provider of a software system and/or a question and answer based customer support system associated with a software system. As an even more specific illustrative example, in some instances, volunteer support personnel of a support community for the software system are subject matter experts best utilized to answer questions directed to the subject matter and area of endeavor of the software system.

As used herein, the term "professional agent support personnel of a support community for the software system" includes paid agents or other support personnel who operate through a support community for the software system and that are used as support resources for generating answer data associated with user submitted question data. As a specific example, professional agent support personnel of a support community for the software system include paid customer support personnel in the employment of, or otherwise associated with, a provider of a software system and/or a question and answer based customer support system associated with a software system. As an even more specific illustrative example, in some instances, professional agent support personnel of a support community for the software system are product installation, operation, and sales experts best utilized to answer product type questions directed to the installation, general operation, and sales of the software system.

Theory and Empirical Analysis

The embodiments disclosed herein were developed to incorporate theories and address relationships discovered through analysis of data collected from a specific question and answer based customer support system implemented by Intuit™ Inc. of Mountain View, Calif. The specific question and answer based customer support system through which the data was collected was the TurboTax™ AnswerXchange™ (AXC) question and answer based customer support system.

AXC is a social question and answer based customer support system providing support for TurboTax™ customers and also serving as a discussion forum in the area of US Federal and State taxation. AXC is also used to generate reusable content for TurboTax™ user searches, i.e., to create a customer support question and answer database for TurboTax™ users. In fact, only 1.5% of AXC users are asking users who actually submit questions, while the remaining searching users look for answers by searching a customer support question and answer database provided through AXC.

AXC includes a support community of customer support personnel. In one embodiment, questions submitted to AXC are answered by members of the support community of customer support personnel. In one embodiment, the customer support personnel include paid professional agent support personnel in the employ of Intuit™ and volunteer support personnel who are often non-paid, expert users of the TurboTax™ software system. In one embodiment, the volunteer support personnel of the TurboTax™ software system are identified and certified by Intuit™.

Questions submitted to AXC are formulated in a variety of ways and directed to various broad categories. As one example, some questions were product related questions, e.g., questions related to pricing, installation, version choice, etc. of the TurboTax™ software system that often had little or no relation to the subject matter/endeavor supported by the TurboTax™ software system, i.e., tax preparation. On the other hand, some questions were subject matter related, or substantive questions, directly related to the subject matter/endeavor supported by the TurboTax™ software system, i.e., Federal and State taxation and tax preparation.

As an example, the questions "What version of TurboTax™ should I use?" or "How do I install TurboTax™?" would be product related questions, while the questions "Can I deduct my computer?" or "What is my adjusted gross income?" would be subject matter related questions. As discussed below, it was empirically determined that, in general, product related questions are best answered by paid professional agent support personnel in the employ of Intuit™ while subject matter related questions are often best answered by volunteer support personnel, e.g., volunteer expert users.

Similar to other question and answer based customer support systems, AXC measures the quality of content, and answer content in particular, by collecting statistics of up and down votes directed to answer content provided by the asking users and searching users where an up vote indicates user satisfaction with the answer to the question and a down vote indicates user dissatisfaction with the answer to the question.

At the same time, the AXC questions were not ranked or judged based on quality of content beyond user satisfaction ratings, unless the question was determined as inappropriate and blocked from AXC. Therefore, user satisfaction with answer content in AXC typically would be derived from user votes alone thus providing a useful metric for answer quality. For example, this approach was applied to predicting answer satisfaction in AXC based on the one or more attributes of the question and answer combined with one or more AXC users' attributes. On the other hand, as disclosed herein, a recent analysis of AXC vote statistics found that answer quality/satisfaction is largely predetermined by the question subject matter, and/or type/format, and that users' satisfaction votes can be predicted with reasonable accuracy based on the attributes of the question alone. This finding provided a practical framework for "pro-active" detection of low-quality content at the question submission stage, i.e. before the question is even answered, and is the foundation of the disclosed embodiments of methods and systems for allocating support resources to a question based on analysis of the question content and predicted user satisfaction with answer content before the answer content is generated.

As noted above, questions submitted to AXC are formulated in a variety of ways and directed to various broad categories and subjects and in various question formats representing various question types. As one example, one user may ask "What version of TurboTax should I use?" Another user may ask "How do I install TurboTax?" Yet another user may ask "Can I deduct my computer?" It was determined that the optimal AXC design must be based on an empiric question taxonomy taking into account one or more of, the question category, the question format, the question grammar structure, the type of anticipated answer, asker type, and various other factors.

The Inventors began with general knowledge/open-ended question taxonomy. Specifically, the Inventors looked for "Wh- word" and "How" questions including interrogative pronouns such as "Who", "What", "When", "Where", "Why" and "How" used to compose general knowledge/open-ended category questions.

FIG. 1A is a table of results data obtained through the analysis of actual questions submitted to AXC. The table of FIG. 1A shows question types, also referred to herein as formats (column 101) of the 2014 AXC questions received, the frequency of the question types as a percentage of questions asked (column 102), and ranking of the question types/formats by up vote fraction (column 103) that are shown in FIG. 1A in the descending order. It is noted that the sum of up vote and down vote fractions can be equal to greater than 100% because some questions may belong to more than one type. As seen in FIG. 1A, when "Wh- words" analysis was applied to the AXC question subjects with question summaries limited to 255 characters, 54.5% of the questions received fell into the general knowledge/open-ended category.

One of the Inventors' goals was to separate question types/formats by the observed statistics relating up and down votes associated with the answers provided to each question types/formats. The result of this analysis is shown in FIG. 1A. Referring to FIG. 1A, note that "Why" formatted questions can often indicate mildly negative sentiment and often imply a rhetorical question, e.g., "Why is this so difficult?" or "Why is this taking so much time?" The Inventors postulate that this explains the lowest up vote fraction of 56.3% being associated with the "Why" question type/format in the general knowledge/open-ended category, as shown in FIG. 1A.

Next, the Inventors selected closed-ended category questions from the 56.8% of AXC questions that did not belong to the general knowledge/open-ended category. Most of the closed-ended type/format questions in AXC were in the sub-category of "Yes/No" type/format questions. These "Yes/No" type/format questions typically start with an auxiliary verb such as "Do", "Can", "Be." As indicated by the name, the "Yes/No" type/format questions can be answered by a "Yes" or "No" answer. A specific illustrative example of a "Yes/No" question would be: "Can I deduct my computer?" with the possible answers "Yes, you can" or "No, you can't."

The second sub-category of closed-ended question type/format includes "Choice" type/format questions. "Choice" type/format questions generally start with an auxiliary verb as well, but also contain the conjunction "or." Consequently, "Choice" type/format questions usually result in a multiple choice answer embedded in the body of the question. A specific illustrative example of a "Choice" type/format question would be "Should I install X or Y version?" with the possible answers "You need to install Y," "You need to install X," "You need to install either X or Y," "You need to install neither X or Y."

As seen in FIG. 1A, closed-ended type/format questions resulted in an impressive 85.9% up vote, i.e., 85.9% of users who submitted questions in the closed-ended format were satisfied with the answer provided. As seen in FIG. 1A, this was the highest satisfaction rating of all question types/formats. The high fraction of the up votes for the answers to the closed-ended type/format questions of in FIG. 1A is not surprising. Closed-ended type/format questions were typically long enough to provide sufficient context for answering, and were more likely to be subject matter related questions, as opposed to product related questions. As discussed below, subject matter related questions were channeled to volunteer support personnel, e.g., volunteer expert users, for answering and had a higher predicted likelihood of resulting in an up vote (see FIG. 1B discussed below).

Finally, if a question submitted to AXC was deemed to be neither a general knowledge/open-ended nor a closed-ended type/format question, the question was classified as being in the ill-formed question category by default. Most of the ill-formed category questions did not follow a grammatically correct question format either intentionally, e.g., search query type, or unintentionally, e.g., improper grammar, punctuation, etc., and were more difficult to answer. This, of course resulted in a higher probability of down vote from the users.

"How" and "Why" question types/formats were detectable with regular expressions analysis. Similarly "When", "Where" and "who" question types/formats were detectable with regular expressions analysis but the analysis was slightly more involved as it typically required part-of-speech tagging to avoid confusion with relative adverbs and relative pronouns. However, as seen in FIG. 1A, these question types/formats were less common in AXC. More exotic question types/formats, such as "tag questions," "leading questions," and "embedded questions," were determined to be extremely rare in AXC and therefore were largely excluded from the Inventors' analysis.

FIG. 1B is a graph of results data obtained through analysis of actual questions submitted to AXC and showing the discovered relationship between: the percentage of up votes indicating user satisfaction with the answer provided (vertical axis), the category of question, e.g., "subject matter questions", or in the case of AXC, tax questions; "product related questions," or in the case of AXC TurboTax™ product questions; and the type/format of the question asked. The horizontal axis in FIG. 1B was divided into Deciles 1 to 10, with Decile 1 corresponding to well-defined subject matter related questions, and Decile 10 corresponding to well-defined product related questions. Consequently, FIG. 1B displays the satisfaction percentages of general knowledge/open-ended (K), closed-ended (C), and ill-formed questions types versus content type. In the Inventors' analysis, only voted upon, and therefore answered, questions were used to ensure the results reported/displayed in FIG. 1B that were consistent with the results reported/displayed in FIG. 1A.

FIG. 1C is a table of results data obtained through analysis of actual questions submitted to AXC showing the Wald Chi-square statistics for the top subject attributes of an AXC user vote prediction model. In FIG. 1C, the (+) and (−) signs indicate positive or negative correlation between attribute and up vote. As seen in FIG. 1C, closed-ended, "Why" and "How" question types are three out of the four most important model attributes. The third attribute, "Reporting a problem," was found to correlate with "Why" and "How" types. As noted above, "Why" questions are often rhetorical and may remain "unanswerable" unless the user provides further details.

Once the data of FIG. 1A, FIG. 1B, and FIG. 1C was obtained, an initial goal of correlating the different question types/formats with the observed statistics relating up and down votes associated with the answers provided to each question type/format was attained. Then three additional goals were identified: transforming "Why" and "How" type/format questions into to closed-ended type/format questions; transforming "unanswerable" questions into "answerable" questions; and transforming ill-formed questions into "well formed" questions.

With respect to the goal of transforming "Why" and "How" type/format questions into to closed-ended type/format questions, it was determined that the biggest positive and negative impacts on AXC user satisfaction came from the answers to closed-ended and "how/why" type/format questions, respectively. While it is difficult to alter the broad category/subject of the question, e.g., switching user attention from product related questions to subject matter related questions, it was determined that it may be possible to transform the question type/format from a low quality format question, with a low predicted user satisfaction with any answer to the question, to a high quality format question, with a higher predicted user satisfaction with any answer to the question. For example, asking the user to re-phrase/transform a "Why" type/format question into a closed-ended type/format question.

With respect to the goal of transforming "unanswerable" questions into "answerable" questions, it was determined that the unanswerable questions were often formed as a statement without specific details. The task therefore involved a re-phrasing/transformation process similar to the process for transforming "Why" and "How" type/format questions into to closed-ended type/format questions, and also asking the user for more information.

With respect to the goal of transforming ill-formed questions into "well formed" questions, it was determined that re-phrasing/transforming ill-formed questions, e.g. making the questions more detailed and adding proper punctuation, may result in better answers. See FIG. 1B.

Figure 2C:
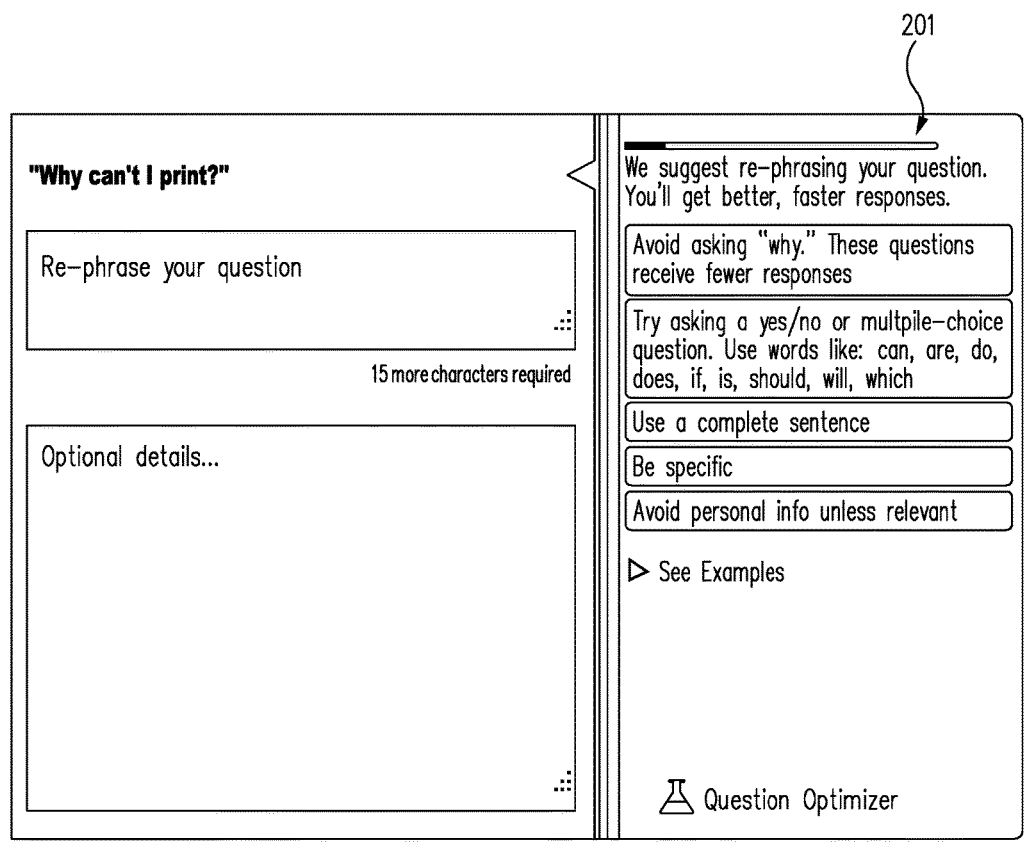
FIG. 2C is an illustrative example of a third question transformation interface screen used to provide users format transformation/question reformation instructions that direct users towards transforming improperly formatted questions into properly formatted questions and including a visual question quality indicator, which provides a simple read of question-quality in accordance with one embodiment.

To address these three goals, the Inventors designed and tested three question transformation user interface screens used to provide format transformation/question reformation instructions that direct users towards transforming improperly formatted questions into properly formatted closed-ended questions. The three prototype question transformation user interface screens are shown in FIGS. 2A, 2B, and 2C, and are discussed separately below.

The first experience prototype, and associated question transformation interface screen, the Inventors explored is shown in FIG. 2A. The experience prototype, and associated question transformation interface screen, of FIG. 2A used constraints to direct users towards asking closed-ended questions, and went as far as defaulting to Yes/No answer types/formats. The experience prototype, and associated question transformation interface screen, of FIG. 2A emphasized closed-ended question types/formats, which yield the highest rated answers (see FIG. 1A). This approach was ultimately determined to be less than ideal because of the front-loaded cognitive overhead it created that forced users to think about their question type/format before they had a chance to even phrase it, and which ultimately proved overly burdensome on the user.

It was found survey-style answer choices helped phrasing. For open-ended general knowledge/open-ended questions, the Inventors prompted with the most highly rated question-types/formats in order of effectiveness (see FIG. 1A), i.e.: "Where" type/format questions, "What" type/format questions, "When" type/format questions, "Who" type/format questions, and "How" type/format questions. The Inventors left out "Why" type/format questions since, as discussed above, "Why" type/format questions often lead to "unanswerable" or rhetorical questions.

The second experience prototype, and associated question transformation interface screen, the Inventors explored is shown in FIG. 2B and is referred to as the question optimizer approach. One example of one embodiment of the question optimizer approach is the Question Optimizer™ used by Intuit Inc. of Mountain View, Calif. The question optimizer experience prototype, and associated question transformation interface screen, of FIG. 2B allows the user to formulate/phrase a question first, then the user is provided the format transformation/question reformation instructions advising the user on how to re-phrase/transform an improperly formatted question into a properly formatted question. The question optimizer experience prototype, and associated question transformation interface screen, of FIG. 2B thus provides contextual cues to the user to help the user re-phrase the question in such a way as to achieve the highest predicted level of satisfaction with any answer to that question using the data of FIG. 1A. Using the one embodiment of the question optimizer experience prototype, and associated question transformation interface screen, of FIG. 2B, users are asked to retype their question rather than edit the question. Research confirmed that this approach helps the users re-phrase the question more effectively.

One advantage of the question optimizer experience prototype, and associated question transformation interface screen, approach of FIG. 2B is that initial question data inputs from the user can be analyzed pro-actively in real time. In most cases, the question type/format could be reliably detected from the first few characters/tokens/text of the question entered, as the question was being entered. The intervention accomplished through the question optimizer experience prototype, and associated question transformation interface screen, of FIG. 2B may therefore come at the very early stages of question formulation, alleviating the user's concern about accidentally losing the question before it is submitted to/recorded in the AXC customer support question and answer database.

To test the question optimizer experience prototype, and associated question transformation interface screen, approach of FIG. 2B, the Inventors used 40 AXC "Why" type/format questions belonging to the bottom 10% question quality. The study participants were Intuit™ employees and Peet's Coffee & Tea™ customers who were shown the "Why" formatted questions inside the question optimizer experience prototype, and associated question transformation interface screen, of FIG. 2B. Samples of the original and re-phrased questions are shown in the following Examples 1, 2 and 3.

Example 1—Transformation from "Why" Type/Format Question to "What" Type/Format Question Original Question: I don't understand why I can't efile"
Re-Phrased Question: "What steps do I need to take to efile?"

Example 2—Transformation from "Why" Type/Format Question to Closed-Ended Type/Format Question Original Question: "why is my debit card being declined"
Re-Phrased Question: "My Debit card has been declined. Is there something I need to do to make it work?"

Example 3—Transformation from "Why" Type/Format Question to "How" Type/Format Question Original Question: "why does the program freeze up when I try to download a state?"
Re-Phrased Question: "When I try to download a state the program is freezing. How can I fix it?"

The overall success rate of the question optimizer experience prototype, and associated question transformation interface screen, of FIG. 2B, i.e., the ability of the user to transform a "Why" type/format question to another, preferred, question type/format was 80%. What was especially encouraging is that some users were able to re-phrase "Why" type/format questions into closed-ended category questions (Example 2) while keeping the original intent of the question intact. This allows us to accomplish stated Goal 1, i.e., transforming "Why" and "How" type/formatted questions into to closed-ended category/formatted questions.

In addition, in most cases, the questions transformed/re-phrased using the question optimizer experience prototype, and associated question transformation interface screen, of FIG. 2B, became easier to understand and "answerable." This allows us to accomplish stated Goal 2, i.e., transforming "unanswerable" questions into "answerable" questions.

In addition, re-phrasing/transforming using the question optimizer experience prototype, and associated question transformation interface screen, of FIG. 2B, typically resulted in better formed/formatted questions compared to the original question, including proper spelling, grammar structure, capitalization and punctuation. This allows us to accomplish stated Goal 3, i.e., transforming ill-formed questions into "well formed" questions.

In another experiment, the Inventors also found that users who were asked to retype the question using the question optimizer experience prototype, and associated question transformation interface screen, of FIG. 2B, generally did a better job in re-phrasing the original question. On the contrary, users who were asked to edit the original question typically kept the original question type intact.

The third experience prototype, and associated question transformation interface screen, the Inventors explored is shown in FIG. 2C which abandons the need to choose between general knowledge/open-ended or closed-ended type/format questions upfront. This allows the user to submit/document their question, and then with that task complete, move on to optimizing/transforming it. The experience prototype, and associated question transformation interface screen, of FIG. 2C also introduces the concept of a visual question quality indicator 201, which provides a simpler read of question-quality. The Inventors believe users will be more interested in-rephrasing/transforming their question multiple times in a quest to get the meter "into the green."

The benefits of the data driven AXC question-asking experience, and the resulting method and system for allocating support resources to a question based on analysis of the question content and predicted user satisfaction with answer content before the answer content is generated disclosed herein, are multifold. Better-formulated questions improve overall user experience and increase chances of receiving better answers contributing to the user satisfaction. More importantly, new questions will be both more relevant and higher quality for the 98.5% of customers who are searching users that leverage existing answers.

The data analysis discussed above provides a compelling argument for the idea that re-phrasing general knowledge/open-ended questions to closed-ended questions using the method and system for allocating support resources to a question based on analysis of the question content and predicted user satisfaction with answer content before the answer content is generated disclosed herein, will result in higher quality question and answer based customer support system content, thus providing higher satisfaction for both the asking and searching user.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment a software system is provided. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment a question and answer based customer support system, e.g., a social question and answer (Q&A) system, is provided to support users of the software system.

In one embodiment, the question and answer based customer support system serves as a discussion forum in an area of endeavor related to the software system. As an illustrative example, in one embodiment, the question and answer based customer support system is provided to support a tax preparation software system and therefore the discussion forum is related to "federal and state taxation and tax preparation."

In one embodiment, users of the software system are provided the capability to submit product type questions regarding the installation, implementation, use and operation of the software system, as well as subject matter type questions, through the question and answer based customer support system.

In one embodiment, the question and answer based customer support system includes one or more support resources which the users of the software system can access through the question and answer based customer support system. In various embodiments, the support resources include but are not limited to, phone-type support resources, chat-type support resources, text-based support resources, audio-based support resources, video-based support resources, support community-based support resources, and/or any support resources, or combination of support resources, as discussed herein, and/or as known/available in the art at the time of filing, and/or as developed/made available after the time of filing.

As discussed below, the support resources are accessed by users to obtain answers, in the form of answer data, to questions submitted by the users in the form of question data to, or through, the question and answer based customer support system.

In one embodiment, the support resources include a support community of customer support personnel. In one embodiment, the customer support personnel include paid professional agent support personnel that are in the employ of the provider of the software system and non-paid volunteer support personnel, e.g., volunteer expert users, of the software system. In one embodiment, the volunteer support personnel of the software system are identified and certified by the provider of the software system.

In one embodiment, through the question and answer based customer support system, users of the software system are provided the capability to submit questions to members of the support community of customer support personnel in the form of submitted question data.

In one embodiment, questions submitted to the question and answer based customer support system can be related to very different broad categories, be of various question types, and be formatted in various different ways. For example, some questions submitted to the question and answer based customer support system are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions, while the questions "Can I deduct my computer?" or "What is my adjusted gross income?" would be subject matter related questions.

In general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions, and route the questions accordingly either to professional agent support personnel or volunteer support personnel of the support community for the software system.

As discussed below, to this end, in one embodiment, an initial parsing and analysis of submitted question data is performed to determine the type of question that is represented by the question data and then make a preliminary determination of what support resources should be allocated to the question data.

As a specific illustrative example, in one embodiment, an initial parsing and analysis of submitted question data is performed to determine if the question that is represented by the question data is a product related question or a subject matter related question. Then, if the question that is represented by the question data is determined to be a product related question, the question that is represented by the question data is preliminarily designated for routing to professional agent support personnel of the support community for the software system. In contrast, if the question that is represented by the question data is determined to be a subject matter related question, the question that is represented by the question data is preliminarily designated for routing to volunteer support personnel of the support community for the software system In one embodiment, the question and answer based customer support system is used to generate reusable content for the question and answer based customer support system, e.g., the question and answer based customer support system is used to generate a customer support question and answer database. In one embodiment, the creation of the customer support question and answer database is the primary goal of the question and answer based customer support system. This is because it has been empirically demonstrated that only 1.5% of users of a typical question and answer based customer support system are asking users who submit their own questions, while the remaining 98.5% of users are searching users who look for answers by searching for similar topics and questions answered in the customer support question and answer database.

As discussed below in more detail, questions submitted to the question and answer based customer support system can also be structured/formatted in a variety of ways and these various question type/formats can vary significantly in quality, and more importantly, in the predicted user satisfaction with an answer, any answer, to the question.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "yes" or "no", or via a multi-choice, or mapping.

As discussed herein, each of these question structures is associated with a empirically calculated predictability that the answer to the question, whatever that answer may be, will be found satisfactory by the users, e.g., the asking user and/or searching users. As also discussed below, this discovery by the Inventors is leveraged by the methods and systems for allocating support resources to a question based on analysis of the question content and predicted user satisfaction with answer content before the answer content is generated disclosed herein to predict user satisfaction with answers that may eventually be provided through the question and answer based customer support system by performing pre-submission analysis of the type/format, and other attributes, of the question itself, rather than post question submission analysis of an answer provided in response to the question. This paradigm shifting approach to predicting user satisfaction with an answer based on the user's question, and before the answer is generated, is in direct contrast to prior art assumptions and approaches that focused on the answers provided through a question and answer based customer support system, and analysis performed after both the question and answer had already been formulated and provided to users.

In one embodiment, low quality question formats that are predicted to result in answers that will have user satisfaction ratings below a threshold level of user satisfaction are defined/identified.

As noted above, questions submitted to the question and answer based customer support system can be formulated in a variety of ways, and directed to various broad categories/subjects, such as product related questions and subject matter related, or substantive questions, directly related to the subject matter/endeavor supported by the software system. As also noted above, questions submitted to question and answer based customer support system can be submitted in a variety question types/formats. Consequently, in one embodiment, the method and system, for allocating support resources to a question based on analysis of the question content and predicted user satisfaction with answer content before the answer content is generated is based on an empiric question taxonomy taking into account one or more of, the question type/format, the question grammar structure, the type of anticipated answer, asker type, and various other factors.

In one embodiment, closed-ended category questions are identified/defined. Most closed-ended formatted questions are placed in the sub-category of "Yes/No" type questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats.

In one embodiment, if a question submitted to the question and answer based customer support system is deemed to be neither a general knowledge/open-ended nor a closed-ended format question, the question is classified as being in the ill-formed question category by default. Most of the ill-formed category questions do not follow a grammatically correct question format either intentionally, as in the case of a search query type, or unintentionally, e.g., wrong grammar, punctuation, etc.

"How" and "Why" question formats are detectable with format analysis instructions that implement regular expressions analysis. Similarly "When", "Where" and "Who" question formats are detectable with format analysis instructions that implement regular expressions analysis, however, the analysis is slightly more involved as it typically requires part-of-speech tagging to avoid confusion with relative adverbs and relative pronouns. As seen in FIG. 1A these question types are less common in question and answer based customer support systems. More exotic question types such as "tag questions," "leading questions," and "embedded questions" are extremely rare in question and answer based customer support systems, and therefore are largely excluded from analysis.

In one embodiment, low quality question formats that are predicted to result in answers that will have user satisfaction ratings below a threshold level of user satisfaction are defined/identified based on the empirical data obtained as discussed above and shown in FIG. 1A.

In various embodiments, the threshold level of user satisfaction required to avoid being identified as a low quality question format can be any threshold level as defined by the provider of the method and system for allocating support resources to a question based on analysis of the question content and predicted user satisfaction with answer content before the answer content is generated, and/or the provider of the question and answer based customer support system.

As seen in FIG. 1A, closed-ended type/format questions have a very high satisfaction rating of 85.9%. In contrast, "Why" type/format questions have a relatively low satisfaction rating of 56.3%. Consequently, in various embodiments, "Why" type/format questions would be defined as low quality question formats. In one embodiment, any question format other than the closed-ended type/format questions is defined as a low quality question format.

In one embodiment, once low quality question formats that are predicted to result in answers that will have user satisfaction ratings below a threshold level of user satisfaction are defined/identified, low quality question format identification data representing the low quality question formats and format analysis instructions required to identify the low quality question formats is generated and stored. In one embodiment, it is stipulated that any questions determined to be in one of the low quality question formats are defined as improperly formatted questions.

In one embodiment, high quality question formats that are predicted to result in answers that will have user satisfaction ratings above a threshold level of user satisfaction are defined/identified.

Retuning to FIG. 1A, closed-ended type/format questions have a very high satisfaction rating of 85.9%. In contrast, "Why" type/format questions have a relatively low satisfaction rating of 56.3%. Consequently, in various embodiments, closed-ended type/format questions would be defined as high quality questions.

In one embodiment, once high quality question formats that are predicted to result in answers that will have user satisfaction ratings above a threshold level of user satisfaction are defined/identified, high quality question format identification data representing the high quality question formats and question format analysis instructions required to identify the high quality question formats is generated and stored. In one embodiment, it is stipulated that any questions determined to be in one of the high quality question formats are properly formatted questions.

As noted above, closed-ended type/format questions have a very high satisfaction rating of 85.9%. Consequently, in various embodiments, all questions of the closed-ended type/format are defined as properly formatted questions and any question in a question format other than the closed-ended format is defined as an improperly formatted question.

Those of skill in the art will recognize that it is not necessary to define both high quality question formats and low quality question formats, or properly formatted and improperly formatted questions, in a single embodiment since definition of either high quality question formats/properly formatted questions or low quality question formats/improperly formatted questions will, by default, define all other question formats as low quality question formats/improperly formatted questions or high quality question formats/properly formatted questions. Consequently, the discussion above is directed to only one illustrative embodiment.

In addition, while in the discussions herein, and in the claims, reference is made to defining and utilizing low quality question formats/improperly formatted questions, or high quality question formats/properly formatted questions, it is to be understood that by defining low quality question formats/improperly formatted questions, both low quality question formats/improperly formatted questions and high quality question formats/properly formatted questions are in fact being defined by default. That is to say, by defining high quality question formats/properly formatted questions, all other question formats are de facto defined as low quality question formats/improperly formatted questions. Likewise, by defining low quality question formats/improperly formatted questions, all other question formats are de facto defined as high quality question formats/properly formatted questions. Therefore, whether high quality question formats/properly formatted questions are defined and used or low quality question formats/improperly formatted questions are defined or used is not limiting and automatically implies the de facto definition of both high quality question formats/properly formatted questions and low quality question formats/improperly formatted questions.

In one embodiment, user historical data indicating the user's previous interaction with the software system and/or question and answer based customer support system is obtained.

In one embodiment, user profile data indicating various user attributes is obtained. In one embodiment, the user profile data includes data obtained from other software systems used by the user and the resulting user profile data is shared with, or linked to, two or more software systems.

As a specific illustrative example, in one embodiment, user historical data is obtained from the provided software system and/or associated question and answer based customer support system. In contrast, user profile data can be obtained from the provided software system and/or associated question and answer based customer support system, such as, for example, a tax preparation software system used by the user, and/or another software system and/or associated question and answer based customer support system, such as, for example, a personal financial management system used by the same user.

As discussed above, in one embodiment, users of the software system are provided the capability to submit product related questions regarding the installation, implementation, use and operation of the software system, as well as subject matter related questions, through the question and answer based customer support system. In one embodiment, a user of the software system begins to enter, and/or submit, question data through the question and answer based customer support system and at least a portion of the question data is received by the question and answer based customer support system.

In one embodiment, questions submitted to the question and answer based customer support system by asking users, i.e., users submitting new questions, are meant to be answered using the support resources, such as, but not limited to, the time and efforts of members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system can be formulated in a variety of ways, directed to various broad categories/subjects, and in be submitted in various question formats representing various question types.

In one embodiment, as the question data is being entered by a user, and/or is otherwise received, the question data is parsed and analyzed before allocating support resources to provide answer data associated with the question data being submitted, as an example, before providing the question data to any of the one or more support personnel. As noted above, in one embodiment, questions submitted to the question and answer based customer support system by asking users are meant to be answered using the support resources, e.g., by members of the support community of customer support personnel. However, using the methods and systems disclosed herein, the question data is parsed and analyzed before allocating any support resources to generating answer data, e.g., providing the question data to any of the one or more support personnel, to determine routing of the question data and/or if the question data represents an improperly formatted question.

As discussed above, in general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions, and route the questions accordingly either to professional agent support personnel or volunteer support personnel of the support community for the software system.

As also discussed above, to this end, in one embodiment, an initial parsing and analysis of submitted question data is performed to determine the type of question that is represented by the question data and then make a preliminary determination of what support resources should be allocated to the question data.

As a specific illustrative example, in one embodiment, an initial parsing and analysis of submitted question data is performed to determine if the question that is represented by the question data is a product related question or a subject matter related question. Then, if the question that is represented by the question data is determined to be a product related question, the question that is represented by the question data is preliminarily designated for routing to professional agent support personnel of the support community for the software system. In contrast, if the question that is represented by the question data is determined to be a subject matter related question, the question that is represented by the question data is preliminarily designated for routing to volunteer support personnel of the support community for the software system.

In one embodiment, as the question data is being entered and/or submitted, the question data is parsed and analyzed using the format analysis instructions required to identify the low quality question formats generated and stored as described above. In another embodiment, as the question data is being entered and/or, the question data is parsed and analyzed using the format analysis instructions required to identify the high quality question formats generated and stored as discussed above.

In one embodiment, general knowledge/open-ended category questions submitted are identified. As noted above, general knowledge/open-ended category questions are of the form "Who," "What," "Where," "When," "How," and "Why" formatted questions. Consequently, in one embodiment, the question data is analyzed to detect these terms, or their functional equivalents.

In one embodiment, "How" and "Why" question formats are detectable using format analysis instructions that implement regular expressions analysis. Similarly "When", "Where" and "Who" question types are detectable using format analysis instructions that implement regular expressions analysis, however, the analysis is slightly more involved as it typically requires part-of-speech tagging to avoid confusion with relative adverbs and relative pronouns.

In one embodiment, closed-ended category questions submitted are identified. In general, closed-ended question formats are detectable using format analysis instructions that implement regular expressions analysis.

As noted above, most closed-ended category format questions are in the sub-category of "Yes/No" type questions. These "Yes/No" type questions are identified by the fact that they typically start with an auxiliary verb such as "Do", "Can", "Be." As also noted above, the second sub-category of closed-ended question format includes "Choice" type questions. These "Choice" type questions are identified by the fact that they generally start with an auxiliary verb and also contain the conjunction "or."

In one embodiment, if a question submitted to the question and answer based customer support system is deemed to be neither a general knowledge/open-ended nor a closed-ended category question, then the question is classified as being in the ill-formed question category by default. Most of the ill-formed category questions do not follow a grammatically correct question format either intentionally (search query type) or unintentionally (wrong grammar, punctuation, etc.) and are more difficult to answer.

In one embodiment, questions being entered into the question and answer based customer support system that are not likely to result in answer data that will satisfy either an asking user or subsequent searching users are identified using both pre-question submission analysis of the attributes, subject matter, and format of the question itself and the obtained user history data.

In one embodiment, questions being entered into the question and answer based customer support system that are not likely to result in answer data that will satisfy either an asking user or subsequent searching users are identified using pre-question submission analysis of the attributes, subject matter, and format of the question itself and the obtained user profile data.

In one embodiment, questions being entered into the question and answer based customer support system that are not likely to result in answer data that will satisfy either an asking user or subsequent searching users are identified using pre-question submission analysis of the attributes, subject matter, and format of the question itself and the obtained user historical data and the user profile data.

In one embodiment, based on the analysis of the entered question data using the format analysis instructions required to identify the low quality question formats generated and stored as discussed above, and/or the format analysis instructions required to identify the high quality question formats generated and stored as discussed above, and/or the user historical data, and/or the user profile data, the question represented by the question data submitted is determined to be either a properly formatted question or an improperly formatted question.

In one embodiment, if, based on the analysis of the entered question data using the format analysis instructions required to identify the low quality question formats generated and stored as discussed above, and/or the format analysis instructions required to identify the high quality question formats generated and stored as discussed above, and/or the user historical data, and/or the user profile data, the question represented by the question data submitted is determined to be an improperly formatted question, the question represented by the question data submitted is allocated support resources, such as, but not limited to, the time of volunteer and professional agent support personnel of a support community, on a low priority basis in an effort to provide answer data to both the asking user and/or searching users, through a customer support question and answer database, on a low priority basis, if at all.

In one embodiment, if, based on the analysis of the entered question data the question represented by the question data submitted is determined to be an improperly formatted question, the question represented by the question data submitted is allocated support resources, such as, but not limited to, the time of volunteer and professional agent support personnel of a support community, only after all properly formatted questions have been allocated support resources.

In one embodiment, if, based on the analysis of the entered question data using the format analysis instructions required to identify the low quality question formats generated and stored as discussed above, and/or the format analysis instructions required to identify the high quality question formats generated and stored as discussed above, and/or the user historical data, and/or the user profile data, the question represented by the question data submitted is determined to be an improperly formatted question, one or more corrective actions are taken.

In various embodiments, the one or more corrective actions taken include, but are not limited to, filtering out the improperly formatted questions before the improperly formatted questions are forwarded/provided to the support community, and before any support resources are devoted to answering the improperly formatted questions.

In various embodiments, the one or more corrective actions taken include, but are not limited to, avoiding the improperly formatted questions completely by refusing to accept submission of the improperly formatted questions.

In various embodiments, the one or more corrective actions taken include, but are not limited to, attempting to correct the improperly formatted questions by providing the user with a set of format transformation/question reformation instructions, in one embodiment, customized to the user based on the user historical data and/or user profile data. In one embodiment, the set of format transformation/question reformation instructions are used to transform an improperly formatted question into a properly formatted question.

In one embodiment, the user is provided the format transformation/question reformation instructions representing suggestions on how to re-phrase/reform the improperly formatted question that are customized to the specific question data being submitted, and/or customized to the user based on the user historical data and/or user profile data, in relative real-time. As a result, improperly formatted questions having low quality question formats are transformed into properly formatted questions having high quality question formats before the question is submitted for response, and before any support resources are devoted to actually trying to answer the improperly formatted question.

As a specific illustrative example, in one embodiment, an asking user's question is parsed and analyzed as it is being entered into the question and answer based customer support system using pre-question submission analysis of the attributes, subject matter, and format of the question itself, and/or user historical data, and/or user profile data, and if the question is determined to be an improperly formatted question because the question is of a low quality broadly framed general knowledge/open-ended question format, the asking user is provided format transformation/question reformation instructions, in one embodiment, generated based in part on the user historical data, and/or user profile data, and the user is guided through a step-by-step process to transform the identified general knowledge/open-ended question format into a properly formatted question having a high quality question format, such as, for example, a closed-ended question format, capable of being answered with a simple "yes" or "no", or a closed-ended question format capable of being answered via multi-choice, or mapping.

In one embodiment, the format transformation/question reformation instructions are used to implement the step-by-step transformation process before the question is submitted to the question and answer based customer support system for response, and before any support resources are devoted to actually trying to answer the improperly formatted question. In one embodiment, the step-by-step transformation process is presented to the user through a question transformation user interface screen that includes a question quality indicator such as, but not limited to, a question quality score or meter. In this way, the user is provided relatively real time feedback regarding the quality of the question being submitted as question data representing the question is modified in accordance with the provided format transformation/question reformation instructions.

As another specific illustrative example, in one embodiment, an asking user's question is parsed and analyzed as it is being entered into the question and answer based customer support system using pre-question submission analysis of the attributes, subject matter, and format of the question itself, and/or user historical data, and/or user profile data. If the question is determined to be an improperly formatted question because the question is a general knowledge/open-ended type/format question, then the asking user is provided format transformation/question reformation instructions, in one embodiment, generated based in part on the user historical data, and/or user profile data, that guide the user through a step-by-step process to transform the identified general knowledge/open-ended format question into the most highly rated general knowledge/open-ended format in order of effectiveness, i.e.: "Where" type/format questions, "What" type/format questions, "When" type/format questions, "Who" type/format questions, and "How" type/format questions, in one embodiment, in that order. In one embodiment, the step-by-step transformation process is presented to the user through a question transformation user interface screen that includes a question quality indicator such as, but not limited to, a question quality score or meter. In this way, the user is provided relatively real time feedback regarding the quality of the question being submitted as question data representing the question is modified in accordance with the provided format transformation/question reformation instructions.

As another specific illustrative example, in one embodiment, an asking user's question is parsed and analyzed as it is being entered into the question and answer based customer support system using pre-question submission analysis of the attributes, subject matter, and format of the question itself, and/or user historical data, and/or user profile data, and if the question is determined to be an improperly formatted question because the question is in a low quality rhetorical, or an otherwise "unanswerable", question format, the asking user is provided format transformation/question reformation instructions, in one embodiment, generated based in part on the user historical data, and/or user profile data, to guide the user through a step-by-step process to transform the identified rhetorical, or unanswerable, improperly formatted question into a properly formatted question in a high quality question format, such as, for example, a closed-ended question, capable of being answered with a simple "yes" or "no", or a closed-ended question capable of being answered by multi-choice, or mapping.

In one embodiment, the format transformation/question reformation instructions are used to implement the step-by-step transformation process before the question is submitted to the question and answer based customer support system for response, and before any support resources are devoted to actually trying to answer the improperly formatted question. In one embodiment, the step-by-step transformation process is presented to the user through a question transformation user interface screen that includes a question quality indicator such as, but not limited to, a question quality score or meter. In this way, the user is provided relatively real time feedback regarding the quality of the question being submitted as question data representing the question is modified in accordance with the provided format transformation/question reformation instructions.

As another specific illustrative example, in one embodiment, an asking user's question is parsed and analyzed as it is being entered into the question and answer based customer support system using pre-question submission analysis of the attributes, subject matter, and format of the question itself, and/or user historical data, and/or user profile data, to identify improperly formatted questions with low quality question formats indicating grammatically incorrect questions and/or queries. In one embodiment, if a question and/or search query is determined to be an improperly formatted question because the question or query is determined to be in a low quality grammatically incorrect question or search query format, the asking or searching user is provided format transformation/question reformation instructions, in one embodiment, generated based in part on the user historical data, and/or user profile data, and thereby guided through a step-by-step process to transform the improperly formatted question or search query into a properly formatted question having a high quality grammatically correct format.

As seen above, in one embodiment, the format transformation/question reformation instructions are used to implement the step-by-step transformation process before the question is officially submitted to the question and answer based customer support system for response, and before any support resources are devoted to actually trying to answer the improperly formatted question. In one embodiment, the step-by-step transformation process is presented to the user through a question transformation user interface screen that includes a question quality indicator such as, but not limited to, a question quality score or meter. In this way, the user is provided relatively real time feedback regarding the quality of the question being submitted as question data representing the question is modified in accordance with the provided format transformation/question reformation instructions.

As noted above, in one embodiment, as a user is entering question data, the question data is parsed and the attributes, subject matter, and format of the question itself is analyzed as discussed herein to identify improperly formatted questions having low quality question formats. If improperly formatted questions are identified, the users are provided format transformation/question reformation instructions and/or suggestions on how to re-phrase/reform the improperly formatted questions. In one embodiment, these format transformation/question reformation instructions and/or suggestions are further customized to the user based on the user's own historical data and/or user profile data. Consequently, the format transformation/question reformation instructions and/or suggestions provided are customized to both the specific question being asked and, in one embodiment, individual user attributes identified using the user's own historical data and/or user profile data.

As also noted above, in one embodiment, the format transformation/question reformation instructions used to transform an improperly formatted question into a properly formatted question are presented to the user through one or more question transformation user interface screens that include a question quality indicator such as, but not limited to, a question quality score or meter. In this way, the user is provided relatively real time feedback regarding the quality of the question being submitted as question data representing the question is modified in accordance with the provided format transformation/question reformation instructions.

FIGS. 2D, 2E, and 2F are representative examples of question transformation user interface screens 200D, 200E, and 200F, which, in this specific illustrative example, are used to transform an improper formatted question (FIG. 2D) into a properly formatted question (FIG. 2F). In this specific illustrative example, FIGS. 2D, 2E, and 2F and question transformation user interface screens 200D, 200E, and 200F, each include a question quality indicator, represented by the specific example of a quality score or meter that is a question optimizer line scale 201 in FIGS. 2D, 2E, and 2F; format transformation/question reformation instructions display region 202; question data entry region 203; and question reformation alert region 207.

As seen in FIG. 2D, question transformation user interface screen 200D includes initial question content 215 with the text "WHY CAN'T I DEDUCT" in all caps and without a question mark. In this specific illustrative example, an initial check of the grammatical format of initial question content 215 indicates: the question represented by initial question content 215 is submitted without proper punctuation, i.e., without a "?" and the question represented by initial question content 215 is submitted in all capital letters. Consequently, in this specific illustrative example, format transformation/question reformation instructions 218 and 219 indicate to the user that a "?" is required and that the letters should be of "sentence" or mixed case.

In this specific illustrative example, as a result of the parsing and analysis procedures discussed herein a determination is made that the question represented by initial question content 215 is in the open-end general information format. Consequently, format transformation/question reformation instruction 220 provides the user with question reformation guidance and examples to help the user reform the question represented by initial question content 215.

In addition, in this specific illustrative example, as a result of the parsing and analysis procedures discussed herein a determination is made that the question represented by initial question content 215 is a "why type" open-end general information question. Consequently, format transformation/question reformation instruction 221 provides the user with question reformation guidance and examples to help the user reform the question represented by initial question content 215.

As also seen in FIG. 2D, because of the identified shortcomings of initial question content 215, question optimizer line scale 201 indicates a relatively low quality score at level 204. In this specific illustrative example, it is stipulated that, based on the format transformation/question reformation instructions 218, 219, 220, and 221 of FIG. 2D and question transformation user interface screen 200D, the user submits first modified question data 235 of FIG. 2E and question transformation user interface screen 200E.

As seen in FIG. 2E, question transformation user interface screen 200E includes first modified question data 235 with the text "hello, I have a single house that I bought in 2014. Can I deducct $20,000 in repairs." In this specific illustrative example, a second check of the grammatical format of the first modified question data 235 submitted indicates: first modified question data 235 represents a question that is too long; includes the greeting "hello"; and includes a misspelling, i.e., "deducct" instead of "deduct." Consequently, in this specific illustrative example: format transformation/question reformation instruction 237 informs the user that first modified question data 235 is too long; format transformation/question reformation instruction 238 informs the user that greetings should be avoided; and format transformation/question reformation instruction 239 points out the misspelling of deduct.

In this specific illustrative example, as a result of the parsing and analysis procedures discussed herein a determination is made that the question represented by first modified question data 235 is in the preferred closed-ended general information format.

As also seen in FIG. 2E, because of the identified shortcomings of first modified question data 235, question optimizer line scale 201 indicates a better, but not optimum, quality score at level 214. In this specific illustrative example, it is stipulated that, based on the format transformation/question reformation instructions 237, 238 and 239 of FIG. 2E and question transformation user interface screen 200E, the user submits second modified question data 245 of FIG. 2F and question transformation user interface screen 200F.

As seen in FIG. 2F, question transformation user interface screen 200F includes second modified question data 245 with the text "Can I deduct repairs that I made to the house I just bought." In this specific illustrative example, a third check of the grammatical format and question format of second modified question data 245 as submitted indicates that there are no longer any grammatical or format issues. Consequently, in this specific illustrative example, format transformation/question reformation instruction 248 informs the user that second modified question data 245 is acceptable and the question represented by second modified question data 245 may be answered.

As also seen in FIG. 2F, because second modified question data 245 is acceptable and the question represented by second modified question data 245 may be answered, question optimizer line scale 201 indicates an optimum quality score at level 224.

Consequently, in the specific illustrative example represented by FIGS. 2D, 2E, and 2F, as the user is entering question data, the question data is parsed and the attributes, subject matter, and format of the question itself is analyzed as discussed herein to identify improperly formatted questions having low quality question formats and the user is provided format transformation/question reformation instructions and/or suggestions on how to re-phrase/reform the improperly formatted question. In the specific illustrative example represented by FIGS. 2D, 2E, and 2F the format transformation/question reformation instructions and/or suggestions provided are customized to both the specific question being asked and, in one embodiment, individual user attributes identified using the user's own historical data and/or user profile data. As a result, the grammatically incorrect, low quality question initially submitted by the user, represented by question data 215 is transformed into a grammatically correct high quality format question represented by second modified question data 245, all before the question content is provided to one or more support personnel for answering the question and before any significant support resources are utilized in an attempt to answer the question.

In one embodiment, when, and if, an improperly formatted question and the undesirable question data is transformed into a properly formatted question and desirable question data, the now properly formatted question and desirable question data is allocated support resources, such as, but not limited to, the time of volunteer and professional agent support personnel of a support community, on a high priority basis in an effort to provide answer content to both the asking user and/or searching users, through a customer support question and answer database, on a high priority basis.

In contrast to the processing of improperly formatted questions, in one embodiment, if, based on the analysis of the entered question data using the format analysis instructions required to identify the low quality question formats generated and stored as discussed above, and/or the format analysis instructions required to identify the high quality question formats generated and stored as discussed above, and/or the user historical data, and/or the user profile data, the question represented by the question data submitted is determined to be a properly formatted question, the question represented by the question data submitted is allocated support resources, such as, but not limited to, the time of volunteer and professional agent support personnel of a support community, on a high priority basis in an effort to provide answer data to both the asking user and/or searching users, through a customer support question and answer database, on a high priority basis, i.e., as soon as possible.

In one embodiment, only when all properly formatted question have been allocated support resources, such as, but not limited to, the time of volunteer and professional agent support personnel of a support community, are any improperly formatted questions allocated support resources, such as, but not limited to, the time of volunteer and professional agent support personnel of a support community.

As noted above, a customer support question and answer database is a critical, if not the most important, feature of a question and answer based customer support system. This is because there is, by definition, a finite number of support resources, such as, for example, support personal, either volunteers or professionals, and, therefore, there is a limit to the amount of support resources, such as support person-hours, available at any time to answer user questions. Consequently, it is important to utilize support resources, such as a support community, efficiently to answer not only just new questions, and thereby avoid redundant efforts, but to answer questions that are likely to result in satisfied users first, as opposed to questions that are unlikely to satisfy either the asking user or subsequent searching users.

Using the concepts disclosed herein, satisfaction with the answers provided through a question and answer based customer support system are predicted before the question is formally submitted to the question and answer based customer support system. Therefore, using the concepts disclosed herein, methods and systems are provided to reliably, efficiently, and proactively predict user satisfaction with a potential answer to a user's question and then route and prioritize the user's question to support resources, such as volunteer and/or professional agent support personnel of a support community, such that those questions predicted to result in high user satisfaction with any answer data generated are provided to the support resources, such as the proper support personnel, in a priority manner, while those questions predicted to result in low user satisfaction with any answer data generated are subjected to one or more corrective actions before being submitted to any support resources, such as support personnel, or are at least given a lower priority for submission to the support resources, such as proper support personnel.

In this way, the satisfaction of asking and/or searching users with question and answer pair data to be potentially provided through the question and answer based customer support system can be predicted to ensure support resources, such as the time and energy of support personnel, are utilized most efficiently and the resulting question and answer pair data is of the highest quality/value.

The disclosed method and system for allocating support resources to a question based on analysis of the question content and predicted user satisfaction with answer content before the answer content is generated provides for significant improvements to the technical fields of customer support, information dissemination, software implementation, and user experience. In addition, using the disclosed method and system for allocating support resources to a question based on analysis of the question content and predicted user satisfaction with answer content before the answer content is generated results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for allocating support resources to a question based on analysis of the question content and predicted user satisfaction with answer content before the answer content is generated disclosed herein.

Process

In one embodiment, a process for allocating support resources to a question based on analysis of the question content and predicted user satisfaction with answer content before the answer content is generated includes providing a software system to one or more users.

In one embodiment, the users of the software are provided a question and answer based customer support system through which question data can be entered by the users. In one embodiment, the users of the software system submit question data representing questions to potentially be provided to one or more support resources associated with the question and answer based customer support system so that the questions represented by the question data can be answered using the support resources.

In one embodiment, low quality and/or high quality question formats are defined and questions having a low quality question format are labeled improperly formatted questions, while questions having a high quality question format are labeled properly formatted questions.

In one embodiment, question data is received representing a question submitted by a user through the question and answer based customer support system. In one embodiment, before allocating support resources to generating answer content related to the question data, the question data is analyzed to determine if the question represented by the question data represents an improperly or properly formatted question.

In one embodiment, if, based on the analysis of the question data, a determination is made that the question data represents an improperly formatted question, one or more corrective actions are taken before allocating support resources to generating answer content related to the question data.

In contrast, in one embodiment, if, based on the analysis of the question data, a determination is made that the question data represents a properly formatted question, the question represented by the question data is allocated support resources to generate answer content related to the question data on a priority basis.

Figure 3:
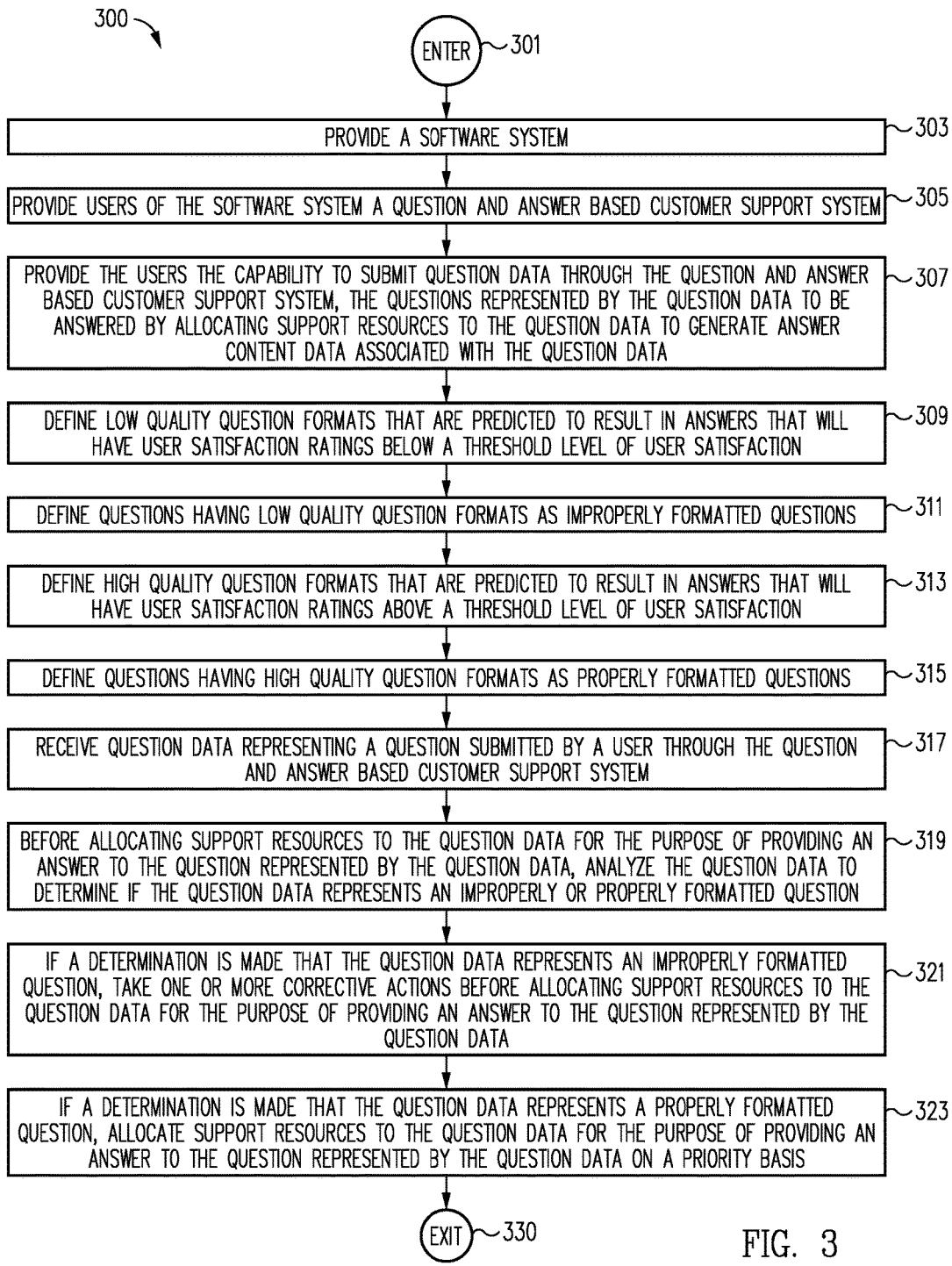
FIG. 3 is a flow chart representing one example of a generalized process for allocating support resources to a question based on analysis of the question content and predicted user satisfaction with answer content before the answer content is generated in accordance with one embodiment.

FIG. 3 is a flow chart representing one example of a process 300 for allocating support resources to a question based on analysis of the question content and predicted user satisfaction with answer content before the answer content is generated in accordance with one embodiment.

As seen in FIG. 3, process 300 for allocating support resources to a question based on analysis of the question content and predicted user satisfaction with answer content before the answer content is generated begins at ENTER OPERATION 301 and process flow proceeds to PROVIDE A SOFTWARE SYSTEM OPERATION 303.

In one embodiment, at PROVIDE A SOFTWARE SYSTEM OPERATION 303, a software system is provided for use by one or more users. In various embodiments, the software system of PROVIDE A SOFTWARE SYSTEM OPERATION 303 is any software system as discussed herein, and/or as known at the time of filling, and/or as developed after the time of filing.

In one embodiment, once a software system is provided at PROVIDE A SOFTWARE SYSTEM OPERATION 303, process flow proceeds to PROVIDE USERS OF THE SOFTWARE SYSTEM A QUESTION AND ANSWER BASED CUSTOMER SUPPORT SYSTEM OPERATION 305.

In one embodiment, at PROVIDE USERS OF THE SOFTWARE SYSTEM A QUESTION AND ANSWER BASED CUSTOMER SUPPORT SYSTEM OPERATION 305 a question and answer based customer support system, e.g., a social question and answer (Q&A) system, is provided to support customers/users of the software system of PROVIDE A SOFTWARE SYSTEM OPERATION 303.

In one embodiment, the question and answer based customer support system of PROVIDE USERS OF THE SOFTWARE SYSTEM A QUESTION AND ANSWER BASED CUSTOMER SUPPORT SYSTEM OPERATION 305 serves as a discussion forum in an area of endeavor related to the software system. As an illustrative example, in one embodiment, the question and answer based customer support system is provided at PROVIDE USERS OF THE SOFTWARE SYSTEM A QUESTION AND ANSWER BASED CUSTOMER SUPPORT SYSTEM OPERATION 305 to support a tax preparation software system and therefore the discussion forum is related to "federal and state taxation and tax preparation."

In one embodiment, users of the software system of PROVIDE A SOFTWARE SYSTEM OPERATION 303 are provided the capability to submit product type questions regarding the installation, implementation, use and operation of the software system, as well as subject matter type questions, through the question and answer based customer support system of PROVIDE USERS OF THE SOFTWARE SYSTEM A QUESTION AND ANSWER BASED CUSTOMER SUPPORT SYSTEM OPERATION 305.

In one embodiment, the question and answer based customer support system of PROVIDE USERS OF THE SOFTWARE SYSTEM A QUESTION AND ANSWER BASED CUSTOMER SUPPORT SYSTEM OPERATION 305 includes one or more support resources which the users of the software system can access through the question and answer based customer support system.

In various embodiments, the support resources of PROVIDE USERS OF THE SOFTWARE SYSTEM A QUESTION AND ANSWER BASED CUSTOMER SUPPORT SYSTEM OPERATION 305 include but are not limited to, phone-type support resources, chat-type support resources, text-based support resources, audio-based support resources, video-based support resources, support community-based support resources, and/or any support resources, or combination of support resources, as discussed herein, and/or as known/available in the art at the time of filing, and/or as developed/made available after the time of filing.

As discussed below, the support resources of PROVIDE USERS OF THE SOFTWARE SYSTEM A QUESTION AND ANSWER BASED CUSTOMER SUPPORT SYSTEM OPERATION 305 are accessed by users to obtain answers, in the form of answer data, to questions submitted by the users in the form of question data to, or through, the question and answer based customer support system.

In one embodiment, the support resources of PROVIDE USERS OF THE SOFTWARE SYSTEM A QUESTION AND ANSWER BASED CUSTOMER SUPPORT SYSTEM OPERATION 305 include a support community of customer support personnel. In one embodiment, the customer support personnel include paid professional agent support personnel that are in the employ of the provider of the software system and non-paid volunteer support personnel, e.g., volunteer expert users, of the software system. In one embodiment, the volunteer support personnel of the software system are identified and certified by the provider of the software system.

In one embodiment, once a question and answer based customer support system is provided to support customers/users of the software system of PROVIDE A SOFTWARE SYSTEM OPERATION 303 at PROVIDE USERS OF THE SOFTWARE SYSTEM A QUESTION AND ANSWER BASED CUSTOMER SUPPORT SYSTEM OPERATION 305. process flow proceeds to PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307.

In one embodiment, at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307 users of the software system are provided the capability to submit questions regarding the software system of PROVIDE A SOFTWARE SYSTEM OPERATION 303 through the question and answer based customer support system of PROVIDE USERS OF THE SOFTWARE SYSTEM A QUESTION AND ANSWER BASED CUSTOMER SUPPORT SYSTEM OPERATION 305.

In one embodiment, at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307 through the question and answer based customer support system of PROVIDE USERS OF THE SOFTWARE SYSTEM A QUESTION AND ANSWER BASED CUSTOMER SUPPORT SYSTEM OPERATION 305, users of the software system of PROVIDE A SOFTWARE SYSTEM OPERATION 303 are provided the capability to submit product questions regarding the installation, implementation, use and operation of the software system, as well as subject matter questions.

In one embodiment, the question and answer based customer support system of PROVIDE USERS OF THE SOFTWARE SYSTEM A QUESTION AND ANSWER BASED CUSTOMER SUPPORT SYSTEM OPERATION 305 includes a support community of customer support personnel. In one embodiment, the customer support personnel include paid professional agent support personnel in the employ of the provider of the software system and volunteer support personnel, e.g., volunteer expert users of the software system. In one embodiment, the volunteer expert users of the software system are identified and certified by the provider of the software system.

In one embodiment, at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307, through the question and answer based customer support system of PROVIDE USERS OF THE SOFTWARE SYSTEM A QUESTION AND ANSWER BASED CUSTOMER SUPPORT SYSTEM OPERATION 305, users of the software system of PROVIDE A SOFTWARE SYSTEM OPERATION 303 are provided the capability to submit questions to members of the support community of customer support personnel.

In one embodiment, questions submitted to the question and answer based customer support system of PROVIDE USERS OF THE SOFTWARE SYSTEM A QUESTION AND ANSWER BASED CUSTOMER SUPPORT SYSTEM OPERATION 305 can be related to very different broad categories, be of various question types, and be formatted in various different ways.

For example, some questions submitted to the question and answer based customer support system of PROVIDE USERS OF THE SOFTWARE SYSTEM A QUESTION AND ANSWER BASED CUSTOMER SUPPORT SYSTEM OPERATION 305 are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system of PROVIDE USERS OF THE SOFTWARE SYSTEM A QUESTION AND ANSWER BASED CUSTOMER SUPPORT SYSTEM OPERATION 305 are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions, while the questions "Can I deduct my computer?" or "What is my adjusted gross income?" would be subject matter related questions.

In general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions, and route the questions accordingly either to professional agent support personnel or volunteer support personnel of the support community for the software system.

As discussed below, to this end, in one embodiment, an initial parsing and analysis of submitted question data is performed to determine the type of question that is represented by the question data and then make a preliminary determination of what support resources should be allocated to the question data.

As a specific illustrative example, in one embodiment, an initial parsing and analysis of submitted question data is performed to determine if the question that is represented by the question data is a product related question or a subject matter related question. Then, if the question that is represented by the question data is determined to be a product related question, the question that is represented by the question data is preliminarily designated for routing to professional agent support personnel of the support community for the software system. In contrast, if the question that is represented by the question data is determined to be a subject matter related question, the question that is represented by the question data is preliminarily designated for routing to volunteer support personnel of the support community for the software system.

In one embodiment, the question and answer based customer support system of PROVIDE USERS OF THE SOFTWARE SYSTEM A QUESTION AND ANSWER BASED CUSTOMER SUPPORT SYSTEM OPERATION 305 is used to generate reusable content for the question and answer based customer support system, e.g., the question and answer based customer support system of PROVIDE USERS OF THE SOFTWARE SYSTEM A QUESTION AND ANSWER BASED CUSTOMER SUPPORT SYSTEM OPERATION 305 is used to generate a customer support question and answer database. In one embodiment, the creation of the customer support question and answer database is the primary goal of the question and answer based customer support system of PROVIDE USERS OF THE SOFTWARE SYSTEM A QUESTION AND ANSWER BASED CUSTOMER SUPPORT SYSTEM OPERATION 305. This is because it has been empirically demonstrated that only 1.5% of users of a typical question and answer based customer support system are asking users who submit their own questions, while the remaining 98.5% of users are searching users who look for answers by searching for similar topics and questions answered in the customer support question and answer database.

As discussed below in more detail, questions submitted to the question and answer based customer support system of PROVIDE USERS OF THE SOFTWARE SYSTEM A QUESTION AND ANSWER BASED CUSTOMER SUPPORT SYSTEM OPERATION 305 can also be structured/formatted in a variety of ways and these various question formats can vary significantly in quality, and more importantly, in the predicted user satisfaction with an answer, any answer, to the question.

As a specific illustrative example, questions submitted to the question and answer based customer support system of PROVIDE USERS OF THE SOFTWARE SYSTEM A QUESTION AND ANSWER BASED CUSTOMER SUPPORT SYSTEM OPERATION 305 can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "yes" or "no", or via a multi-choice, or mapping.

As discussed herein, each of these question structures is associated with a calculated predictability that the answer to the question, whatever that answer may be, will be found satisfactory by the users, e.g., the asking user and/or searching users. As also discussed herein, this discovery by the inventors is leveraged by process 300 for allocating support resources to a question based on analysis of the question content and predicted user satisfaction with answer content before the answer content is generated to predict user satisfaction with answers that may eventually be provided through the question and answer based customer support system by performing pre-submission parsing and analysis of the type/format, and other attributes, of the question itself, rather than post question submission analysis of an answer provided in response to the question. This paradigm shifting approach to predicting user satisfaction with an answer based on the user's question alone, and before the answer is generated, is in direct contrast to prior art assumptions and approaches that focused on the answers provided through a question and answer based customer support system, and analysis performed after both the question and answer had already been formulated and provided to users.

In one embodiment, once users of the software system are provided the capability to submit questions regarding the installation, implementation, use and operation of the software system of PROVIDE A SOFTWARE SYSTEM OPERATION 303 through the question and answer based customer support system of PROVIDE USERS OF THE SOFTWARE SYSTEM A QUESTION AND ANSWER BASED CUSTOMER SUPPORT SYSTEM OPERATION 305 at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307, process flow proceeds to DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In one embodiment, at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309, low quality question formats that are predicted to result in answers that will have user satisfaction ratings below a threshold level of user satisfaction are defined/identified.

As discussed above, the embodiments disclosed herein were developed to incorporate theories and address relationships discovered through analysis of data collected from a specific question and answer based customer support system providing support for a specific software system. This data was then leveraged to develop process 300 for allocating support resources to a question based on analysis of the question content and predicted user satisfaction with answer content before the answer content is generated.

As noted above, questions submitted to the question and answer based customer support system can be formulated in a variety of ways and directed to various broad categories/subjects, such as product related questions, e.g., questions related to pricing, installation, version choice, etc. of the software system that have little or no relation to the subject matter/endeavor supported by the software system and subject matter related, or substantive questions, directly related to the subject matter/endeavor supported by the software system. As also noted above, questions submitted to question and answer based customer support system can be submitted in a variety question types/formats. Consequently, in one embodiment, process 300 for allocating support resources to a question based on analysis of the question content and predicted user satisfaction with answer content before the answer content is generated is based on an empiric question taxonomy taking into account the question format, the question grammar structure, the type of anticipated answer, asker type, and various other factors.

In one embodiment, closed-ended category questions are identified/defined. Most closed-ended formatted questions are placed in the sub-category of "Yes/No" type questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submitted questions in the closed-ended format were satisfied with the answer provided. As seen in FIG. 1A, this was the highest satisfaction rating of all question formats. Therefore, in various embodiments, the closed-ended format is the preferred question format.

In one embodiment, general knowledge/open-ended category questions are identified/defined including "Who" type/format questions, "What" type/format questions, "When" type/format questions, "Where" type/format questions, "Why" type/format questions, and "How" type/format questions. "How" and "Why" question formats are detectable with format analysis instructions that implement regular expressions analysis. Similarly "When", "Where" and "Who" question formats are detectable with format analysis instructions that implement regular expressions analysis but the analysis is slightly more involved as it typically requires part-of-speech tagging to avoid confusion with relative adverbs and relative pronouns. However, as seen in FIG. 1A, these question types are less common in question and answer based customer support systems. More exotic question types such as "tag questions," "leading questions," and "embedded questions" are extremely rare in question and answer based customer support systems, and therefore are largely excluded from analysis.

In one embodiment, if a question submitted to the question and answer based customer support system is deemed to be neither a general knowledge/open-ended nor a closed-ended format question, the question is classified as being in the ill-formed question category by default. Most of the ill-formed category questions do not follow a grammatically correct question format either intentionally, as in the case of a search query type, or unintentionally, e.g., wrong grammar, punctuation, etc.

In one embodiment, low quality question formats that are predicted to result in answers that will have user satisfaction ratings below a threshold level of user satisfaction are defined/identified at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309 (FIG. 3) based on the empirical data obtained as discussed above and shown in FIG. 1A.

Retuning to FIG. 1A, a table of results data obtained through the analysis of actual questions submitted to a question and answer based customer support system shows question types, also referred to herein as formats and/or categories, (column 101) of the questions received, the frequency of the question types as a percentage of questions asked (column 102), and ranking of the question types by up vote fraction (column 103), in descending order.

As seen in FIG. 1A, observed statistics relating up and down votes associated with the answers provided to each question type/format is shown. As seen in FIG. 1A, closed-ended type/format questions have a very high satisfaction rating of 85.9%. In contrast, "Why" type/format questions have a relatively low satisfaction rating of 56.3%. Consequently, in various embodiments, "Why" type/format questions would be defined as low quality question formats at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In one embodiment, any question format having a satisfaction rating of less than a threshold level of user satisfaction of 85.9%, i.e., any question type/format other than closed-ended, would be defined as low quality question formats at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In one embodiment, any question formats having a satisfaction rating of less than a threshold level of user satisfaction of 81.4%, i.e., any question type/format other than closed-ended or "Who", would be defined as low quality question formats at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In one embodiment, any question formats having a satisfaction rating of less than a threshold level of user satisfaction of 73.1%, i.e., any question type/format other than closed-ended, "Who", or "What" would be defined as low quality question formats at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In one embodiment, any question formats having a satisfaction rating of less than a threshold level of user satisfaction of 70.2%, i.e., any question type/format other than closed-ended, "Who," "What," or "When" would be defined as low quality question formats at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In various embodiments, the threshold level of user satisfaction required to avoid being identified as a low quality question format can be any threshold level as defined by the provider of process 300 for allocating support resources to a question based on analysis of the question content and predicted user satisfaction with answer content before the answer content is generated and/or the question and answer based customer support system of PROVIDE USERS OF THE SOFTWARE SYSTEM A QUESTION AND ANSWER BASED CUSTOMER SUPPORT SYSTEM OPERATION 305.

In one embodiment, once low quality question formats that are predicted to result in answers that will have user satisfaction ratings below a threshold level of user satisfaction are defined/identified at DEFINE LOW QUALITY QUESTION FORMATS THAT ARE PREDICTED TO RESULT IN ANSWERS THAT WILL HAVE USER SATISFACTION, RATINGS BELOW A THRESHOLD LEVEL OF USER SATISFACTION OPERATION 309, low quality question format identification data representing the low quality question formats and format analysis instructions required to identify the low quality question formats is generated and stored at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309.

In one embodiment, once low quality question formats that are predicted to result in answers that will have user satisfaction ratings below a threshold level of user satisfaction are defined/identified and low quality question format identification data representing the low quality question formats and format analysis instructions required to identify the low quality question formats is generated and stored at DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309, process flow proceeds to DEFINE QUESTIONS HAVING LOW QUALITY QUESTION FORMATS AS IMPROPERLY FORMATTED QUESTIONS OPERATION 311.

In one embodiment, at DEFINE QUESTIONS HAVING LOW QUALITY QUESTION FORMATS AS IMPROPERLY FORMATTED QUESTIONS OPERATION 311, it is stipulated that any questions determined to be in one of the low quality question formats of DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309 are defined as improperly formatted questions.

In one embodiment, once it is stipulated that any questions determined to be in one of the low quality question formats of DEFINE LOW QUALITY QUESTION FORMATS THAT ARE PREDICTED TO RESULT IN ANSWERS THAT WILL HAVE USER SATISFACTION RATINGS BELOW A THRESHOLD LEVEL OF USER SATISFACTION OPERATION 309 are improperly formatted questions at DEFINE QUESTIONS HAVING LOW QUALITY QUESTION FORMATS AS IMPROPERLY FORMATTED QUESTIONS OPERATION 311, process flow proceeds to DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313, high quality question formats that are predicted to result in answers that will have user satisfaction ratings above a threshold level of user satisfaction are defined/identified.

Retuning to FIG. 1A, closed-ended type/format questions have a very high satisfaction rating of 85.9%. In contrast, "Why" type/format questions have a relatively low satisfaction rating of 56.3%. Consequently, in various embodiments, closed-ended type/format questions would be defined as high quality questions formats at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, any question formats having a satisfaction rating greater than a threshold level of user satisfaction of 82%, i.e., the closed-ended question format, would be defined as high quality question formats at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, any question formats having a satisfaction rating greater than a threshold level of user satisfaction of 81%, i.e., the closed-ended or "Who" question formats, would be defined as high quality question formats at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, any question formats having a satisfaction rating greater than a threshold level of user satisfaction of 73%, i.e., the closed-ended, "Who", or "What" question formats would be defined as high quality question formats at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, any question formats having a satisfaction rating greater than a threshold level of user satisfaction of 70%, i.e., the closed-ended, "Who," "What," "When," or "Where" question formats would be defined as high quality question formats at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In various embodiments, the threshold level of user satisfaction required to avoid being identified as a low quality question format can be any threshold level as defined by the provider of process 300 for allocating support resources to a question based on analysis of the question content and predicted user satisfaction with answer content before the answer content is generated and/or the question and answer based customer support system of PROVIDE USERS OF THE SOFTWARE SYSTEM A QUESTION AND ANSWER BASED CUSTOMER SUPPORT SYSTEM OPERATION 305.

As noted above, closed-ended type/format questions have a very high satisfaction rating of 85.9%. Consequently, in various embodiments, closed-ended type/format questions are defined as high quality question formats at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313 and any question format other than "closed-ended" format is defined as a low quality question format at DEFINE LOW QUALITY QUESTION FORMATS THAT ARE PREDICTED TO RESULT IN ANSWERS THAT WILL HAVE USER SATISFACTION, RATINGS BELOW A THRESHOLD LEVEL OF USER SATISFACTION OPERATION 309.

In one embodiment, once high quality question formats that are predicted to result in answers that will have user satisfaction ratings above a threshold level of user satisfaction are defined/identified at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313, high quality question format identification data representing the high quality question formats and question format analysis instructions required to identify the high quality question formats is generated and stored at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, once high quality question formats that are predicted to result in answers that will have user satisfaction ratings above a threshold level of user satisfaction are defined/identified and high quality question format identification data representing the high quality question formats and question format analysis instructions required to identify the high quality question formats is generated and stored at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313, process flow proceeds to DEFINE QUESTIONS HAVING HIGH QUALITY QUESTION FORMATS AS PROPERLY FORMATTED QUESTIONS OPERATION 315.

In one embodiment, at DEFINE QUESTIONS HAVING HIGH QUALITY QUESTION FORMATS AS PROPERLY FORMATTED QUESTIONS OPERATION 315, it is stipulated that any questions determined to be in one of the high quality question formats that are predicted to result in answers that will have user satisfaction ratings above a threshold level of user satisfaction of DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313 are properly formatted questions.

As noted above, closed-ended type/format questions have a very high satisfaction rating of 85.9%. Consequently, in various embodiments, all questions of the closed-ended type/format are defined as properly formatted questions at DEFINE QUESTIONS HAVING HIGH QUALITY QUESTION FORMATS AS PROPERLY FORMATTED QUESTIONS OPERATION 315 and any question in a question format other than the closed-ended format is defined as an improperly formatted question at DEFINE QUESTIONS HAVING LOW QUALITY QUESTION FORMATS AS IMPROPERLY FORMATTED QUESTIONS OPERATION 311.

Those of skill in the art will recognize that it is not necessary to define both high quality question formats and low quality question formats, or properly formatted and improperly formatted questions, in a single embodiment since definition of either high quality question formats/properly formatted questions or low quality question formats/improperly formatted questions will, by default, define all other question formats as low quality question formats/improperly formatted questions or high quality question formats/properly formatted questions. Consequently, the discussion above is directed to only one illustrative embodiment.

In addition, while in the discussions herein, and in the claims, reference is made to defining and utilizing low quality question formats/improperly formatted questions, or high quality question formats/properly formatted questions, it is to be understood that by defining low quality question formats/improperly formatted questions both low quality question formats/improperly formatted questions and high quality question formats/properly formatted questions are in fact being defined by default. That is to say, by defining high quality question formats/properly formatted questions, all other question formats are de facto defined as low quality question formats/improperly formatted questions. Likewise, by defining low quality question formats/improperly formatted questions, all other question formats are de facto defined as high quality question formats/properly formatted questions. Therefore, whether high quality question formats/properly formatted questions are defined and used or low quality question formats/improperly formatted questions are defined or used is not limiting and automatically implies the de facto definition of both high quality question formats/properly formatted questions and low quality question formats/improperly formatted questions.

In one embodiment, user historical data and/or user profile data is obtained indicating the user's previous interaction with the software system of PROVIDE A SOFTWARE SYSTEM OPERATION 303, and/or the question and answer based customer support system of PROVIDE USERS OF THE SOFTWARE SYSTEM A QUESTION AND ANSWER BASED CUSTOMER SUPPORT SYSTEM OPERATION 305.

In one embodiment, the user historical data is obtained from the software system provided at PROVIDE A SOFTWARE SYSTEM OPERATION 303 and/or the question and answer based customer support system of PROVIDE USERS OF THE SOFTWARE SYSTEM A QUESTION AND ANSWER BASED CUSTOMER SUPPORT SYSTEM OPERATION 305. In other embodiments, the user historical data is obtained from any source of user historical data as discussed herein, and/or as known in the art at the time of filing, and/or as developed after the time of filing.

In one embodiment, user profile data indicating various user attributes is obtained. In one embodiment, the user profile data includes data obtained from software systems used by the user other than the software system provided at PROVIDE A SOFTWARE SYSTEM OPERATION 303. In other embodiments the user profile data is obtained from any source of user profile data as discussed herein, and/or as known in the art at the time of filing, and/or as developed after the time of filing.

In one embodiment, once the user profile data, and/or user historical data, is obtained the user profile data, and/or user historical data, is shared with, or linked to, two or more software systems used by the user. For instance, as an illustrative example of one embodiment, the user profile data, and/or user historical data is made available to a tax preparation software system, a personal financial management software system, and a small business management software system used by the user.

In one embodiment, once it is stipulated that any questions determined to be in one of the high quality question formats that are predicted to result in answers that will have user satisfaction ratings above a threshold level of user satisfaction of DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313 are properly formatted questions at DEFINE QUESTIONS HAVING HIGH QUALITY QUESTION FORMATS AS PROPERLY FORMATTED QUESTIONS OPERATION 315 process flow proceeds to RECEIVE QUESTION DATA REPRESENTING A QUESTION SUBMITTED BY A USER THROUGH THE QUESTION AND ANSWER BASED CUSTOMER SUPPORT SYSTEM OPERATION 317.

As discussed above, in one embodiment, users of the software system of PROVIDE A SOFTWARE SYSTEM OPERATION 303 are provided the capability to submit questions regarding the installation, implementation, use and operation of the software system of PROVIDE A SOFTWARE SYSTEM OPERATION 303 through the question and answer based customer support system of PROVIDE USERS OF THE SOFTWARE SYSTEM A QUESTION AND ANSWER BASED CUSTOMER SUPPORT SYSTEM OPERATION 305.

In one embodiment, at RECEIVE QUESTION DATA REPRESENTING A QUESTION SUBMITTED BY A USER THROUGH THE QUESTION AND ANSWER BASED CUSTOMER SUPPORT SYSTEM OPERATION 317, a user of the software system of PROVIDE A SOFTWARE SYSTEM OPERATION 303 begins to enter, and/or submit, question data through the question and answer based customer support system of PROVIDE USERS OF THE SOFTWARE SYSTEM A QUESTION AND ANSWER BASED CUSTOMER SUPPORT SYSTEM OPERATION 305 and at least a portion of the question data is received by the question and answer based customer support system of PROVIDE USERS OF THE SOFTWARE SYSTEM A QUESTION AND ANSWER BASED CUSTOMER SUPPORT SYSTEM OPERATION 305.

In one embodiment, questions submitted to the question and answer based customer support system by asking users at RECEIVE QUESTION DATA REPRESENTING A QUESTION SUBMITTED BY A USER THROUGH THE QUESTION AND ANSWER BASED CUSTOMER SUPPORT SYSTEM OPERATION 317 are meant to be answered using the support resources, such as, but not limited to, the time and efforts of members of the support community of customer support personnel.

In various embodiments, at RECEIVE QUESTION DATA REPRESENTING A QUESTION SUBMITTED BY A USER THROUGH THE QUESTION AND ANSWER BASED CUSTOMER SUPPORT SYSTEM OPERATION 317 the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system at RECEIVE QUESTION DATA REPRESENTING A QUESTION SUBMITTED BY A USER THROUGH THE QUESTION AND ANSWER BASED CUSTOMER SUPPORT SYSTEM OPERATION 317 can be formulated in a variety of ways and directed to various broad categories/subjects and in various question formats representing various question types.

In one embodiment, once a user of the software system begins to enter, and/or submit, question data through the question and answer based customer support system, and at least a portion of the question data is received by the question and answer based customer support system, at RECEIVE QUESTION DATA REPRESENTING A QUESTION SUBMITTED BY A USER THROUGH THE QUESTION AND ANSWER BASED CUSTOMER SUPPORT SYSTEM OPERATION 317, process flow proceeds to BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319.

In one embodiment, at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319, as the question data is being entered by a user, and/or is otherwise received, at RECEIVE QUESTION DATA REPRESENTING A QUESTION SUBMITTED BY A USER THROUGH THE QUESTION AND ANSWER BASED CUSTOMER SUPPORT SYSTEM OPERATION 317, as the question data is being entered by a user, and/or is otherwise received, the question data is parsed and analyzed before allocating support resources to provide answer data associated with the question data being submitted, as an example, before providing the question data to any of the one or more support personnel.

As noted above, in one embodiment, questions submitted to the question and answer based customer support system by asking users at RECEIVE QUESTION DATA REPRESENTING A QUESTION SUBMITTED BY A USER THROUGH THE QUESTION AND ANSWER BASED CUSTOMER SUPPORT SYSTEM OPERATION 317 are meant to be answered using the support resources, e.g., by members of the support community of customer support personnel. However, using the methods and systems disclosed herein, the question data is parsed and analyzed before allocating any support resources to generating answer data, e.g., providing the question data to any of the one or more support personnel, to determine routing of the question data and/or if the question data represents an improperly formatted question.

As discussed above, in general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions, and route the questions accordingly either to professional agent support personnel or volunteer support personnel of the support community for the software system.

As also discussed above, to this end, in one embodiment, at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 an initial parsing and analysis of submitted question data is performed to determine the type of question that is represented by the question data and then make a preliminary determination of what support resources should be allocated to the question data.

As a specific illustrative example, in one embodiment, an initial parsing and analysis of submitted question data is performed at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 to determine if the question that is represented by the question data is a product related question or a subject matter related question. Then, if the question that is represented by the question data is determined to be a product related question, the question that is represented by the question data is preliminarily designated for routing to professional agent support personnel of the support community for the software system at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319. In contrast, if the question that is represented by the question data is determined to be a subject matter related question, the question that is represented by the question data is preliminarily designated for routing to volunteer support personnel of the support community for the software system at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319.

In one embodiment, as the question data is being entered and/or submitted at RECEIVE QUESTION DATA REPRESENTING A QUESTION SUBMITTED BY A USER THROUGH THE QUESTION AND ANSWER BASED CUSTOMER SUPPORT SYSTEM OPERATION 317, the question data is parsed and analyzed using the format analysis instructions required to identify the low quality question formats generated and stored at DEFINE LOW QUALITY QUESTION FORMATS THAT ARE PREDICTED TO RESULT IN ANSWERS THAT WILL HAVE USER SATISFACTION, RATINGS BELOW A THRESHOLD LEVEL OF USER SATISFACTION OPERATION 309.

In one embodiment, as the question data is being entered and/or submitted at RECEIVE QUESTION DATA REPRESENTING A QUESTION SUBMITTED BY A USER THROUGH THE QUESTION AND ANSWER BASED CUSTOMER SUPPORT SYSTEM OPERATION 317, the question data is parsed and analyzed using the format analysis instructions required to identify the high quality question formats generated and stored at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313.

In one embodiment, general knowledge/open-ended category questions submitted at RECEIVE QUESTION DATA REPRESENTING A QUESTION SUBMITTED BY A USER THROUGH THE QUESTION AND ANSWER BASED CUSTOMER SUPPORT SYSTEM OPERATION 317 are identified at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319.

As noted above, general knowledge/open-ended category questions are of the form "Who," "What," "Where," "When," "How," and "Why: formatted questions. Consequently, at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 the question data is parsed and analyzed to detect these terms, or their functional equivalents.

"How" and "Why" question formats are detectable at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 using format analysis instructions that implement regular expressions analysis. Similarly "When", "Where" and "Who" question types are detectable at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 using format analysis instructions that implement regular expressions analysis but the analysis is slightly more involved as it typically requires part-of-speech tagging to avoid confusion with relative adverbs and relative pronouns.

In one embodiment, closed-ended category questions submitted at RECEIVE QUESTION DATA REPRESENTING A QUESTION SUBMITTED BY A USER THROUGH THE QUESTION AND ANSWER BASED CUSTOMER SUPPORT SYSTEM OPERATION 317 are identified at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319.

In general, closed-ended question formats are detectable at BEFORE ALLOCATING SUPPORT RESOURCES TO THE QUESTION DATA FOR THE PURPOSE OF PROVIDING AN ANSWER TO THE QUESTION REPRE- SENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 using format analysis instructions that implement regular expressions analysis.

As noted above, most closed-ended category format questions are in the sub-category of "Yes/No" type questions. These "Yes/No" type questions are identified at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 by the fact that they typically start with an auxiliary verb such as "Do", "Can", "Be."

As noted above, the second sub-category of closed-ended question format includes "Choice" type questions. These "Choice" type questions are identified at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 by the fact that they generally start with an auxiliary verb as well, and also contain the conjunction "or."

In one embodiment, if a question submitted to the question and answer based customer support system at RECEIVE QUESTION DATA REPRESENTING A QUESTION SUBMITTED BY A USER THROUGH THE QUESTION AND ANSWER BASED CUSTOMER SUPPORT SYSTEM OPERATION 317 is deemed to be neither a general knowledge/open-ended nor a closed-ended category question at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319, then the question is classified as being in the ill-formed question category by default. Most of the ill-formed category questions do not follow a grammatically correct question format either intentionally (search query type) or unintentionally (wrong grammar, punctuation, etc.) and are more difficult to answer.

In one embodiment, at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 questions being entered into the question and answer based customer support system that are not likely to result in answer data that will satisfy either an asking user or subsequent searching users are identified using not only pre-question submission analysis of the attributes, subject matter, and format of the question itself, but also the obtained user history data indicating the user's historical use and interaction with the software system of PROVIDE A SOFTWARE SYSTEM OPERATION 303, and/or the question and answer based customer support system of PROVIDE USERS OF THE SOFTWARE SYSTEM A QUESTION AND ANSWER BASED CUSTOMER SUPPORT SYSTEM OPERATION 305.

In one embodiment, at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 questions being entered into the question and answer based customer support system that are not likely to result in answer data that will satisfy either an asking user or subsequent searching users are identified using not only pre-question submission analysis of the attributes, subject matter, and format of the question itself, but also the obtained user profile data indicating the user's personal attributes.

In one embodiment, based on the analysis of the entered question data using the format analysis instructions required to identify the low quality question formats generated and stored at DEFINE LOW QUALITY QUESTION FORMATS THAT ARE PREDICTED TO RESULT IN ANSWERS THAT WILL HAVE USER SATISFACTION, RATINGS BELOW A THRESHOLD LEVEL OF USER SATISFACTION OPERATION 309 and/or the format analysis instructions required to identify the high quality question formats generated and stored at DEFINE HIGH QUALITY QUESTION FORMATS THAT ARE PREDICTED TO RESULT IN ANSWERS THAT WILL HAVE USER SATISFACTION RATINGS ABOVE A THRESHOLD LEVEL OF USER SATISFACTION OPERATION 313, and/or the user historical and/or profile data, the question represented by the question data submitted at RECEIVE QUESTION DATA REPRESENTING A QUESTION SUBMITTED BY A USER THROUGH THE QUESTION AND ANSWER BASED CUSTOMER SUPPORT SYSTEM OPERATION 317 is determined to be either a properly formatted question or an improperly formatted question at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319.

As noted above, in one embodiment, questions submitted to the question and answer based customer support system by users at RECEIVE QUESTION DATA REPRESENTING A QUESTION SUBMITTED BY A USER THROUGH THE QUESTION AND ANSWER BASED CUSTOMER SUPPORT SYSTEM OPERATION 317 are meant to be answered using support resources, such as members of the support community of customer support personnel. However, in one embodiment, at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319, the question data is analyzed and a determination as to whether the question data represents a properly formatted question or an improperly formatted question is made before any support resources, such as members of the support community of customer support personnel, are allocated for the purpose of providing an answer to the question to determine if the question data represents an improperly formatted question. Consequently, in one embodiment, the analysis of BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 is performed while the question is still being formulated and before any support resources are devoted to trying to answer improperly formatted questions.

In one embodiment, once the question data is being analyzed before allocating any support resources to the question, e.g., before providing the question data to any of the one or more support personnel, for the purpose of providing an answer to the question represented by the question data at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319, process flow proceeds to IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321.

In one embodiment, at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321, if the analysis of BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 determines that the question data submitted at RECEIVE QUESTION DATA REPRESENTING A QUESTION SUBMITTED BY A USER THROUGH THE QUESTION AND ANSWER BASED CUSTOMER SUPPORT SYSTEM OPERATION 317 represents an improperly formatted question, one or more corrective actions are taken.

In various embodiments, the one or more corrective actions taken at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 include, but are not limited to, allocating support resources, such as, but not limited to, the time of volunteer and professional agent support personnel of a support community, to the question represented by the question data on a low priority basis in an effort to provide answer data to both the asking user and/or searching users, through a customer support question and answer database, on a low priority basis, if at all.

In one embodiment, if, based on the analysis of the entered question data the question represented by the question data submitted is determined to be an improperly formatted question, at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 the question represented by the question data submitted is allocated support resources, such as, but not limited to, the time of volunteer and professional agent support personnel of a support community, only after all properly formatted questions have been allocated support resources.

In various embodiments, the one or more corrective actions taken at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 include, but are not limited to, filtering out the improperly formatted questions before any support resources are allocated to the improperly formatted questions, e.g., before the improperly formatted questions are forwarded/provided to the support community, and before any support resources are devoted to answering the improperly formatted questions.

In various embodiments, the one or more corrective actions taken at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 include, but are not limited to, avoiding the improperly formatted questions completely by refusing to accept submission of the improperly formatted questions.

In various embodiments, the one or more corrective actions taken at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 include, but are not limited to, attempting to correct the improperly formatted questions by providing the user with a set of format transformation/question reformation instructions used to transform an improperly formatted question into a properly formatted question.

In one embodiment, at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 the user is provided format transformation/question reformation instructions representing suggestions on how to re-phrase/reform the improperly formatted question. In one embodiment, the format transformation/question reformation instructions for transforming the improperly formatted question into a properly formatted question are customized to the specific question data being submitted, in relative real-time. As a result, improperly formatted questions having low quality question formats are transformed into properly formatted questions having high quality question formats before any support resources are allocated to the improperly formatted questions, e.g., before the improperly formatted questions are forwarded/provided to the support community, and before any support resources are devoted to answering the improperly formatted questions.

In one embodiment, the question reformation instructions used to transform an improperly formatted question into a properly formatted question of IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 are generated by dynamically analyzing the format of the user's question as submitted; in one embodiment, as the question is being formed/created and entered into the question and answer based customer support system. In short, in one embodiment, as a user is entering question data, the question data is parsed and the attributes, subject matter, and format of the question itself is analyzed as discussed herein to identify improperly formatted questions having low quality question formats. If improperly formatted questions are identified, the users are provided format transformation/question reformation instructions and/or suggestions on how to re-phrase/reform the improperly formatted questions. In one embodiment, these format transformation/question reformation instructions and/or suggestions are further customized to the user based on the user's own historical data and/or user profile data. Consequently, the format transformation/question reformation instructions and/or suggestions provided are customized to both the specific question being asked and, in one embodiment, individual user attributes identified using the user's own historical data and/or user profile data.

In one embodiment, at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321, the user history data is used to formulate one or more customized sample re-worded questions and/or question re-wording guidelines. In this way, the undesirable question content representing improperly formatted questions is transformed into properly formatted questions that provide a higher probability of user satisfaction with any answer content eventually provided in a manner customized to the user and based on the user's own historical data.

In one embodiment, at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321, the user profile data is used to formulate one or more customized sample re-worded questions and/or question re-wording guidelines. In this way, the undesirable question content representing improperly formatted questions is transformed into properly formatted questions that provide a higher probability of user satisfaction with any answer content eventually provided in a manner customized to the user and based on the user's own profile data.

In one embodiment, the format transformation/question reformation instructions for transforming the improperly formatted question into a properly formatted question of IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 are customized to the specific question being submitted, the user's historical data, and/or the user's profile data in relative real-time.

In one embodiment, the format transformation/question reformation instructions for transforming the improperly formatted question into a properly formatted question of IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 are customized to the specific question being submitted, the user's historical data, and/or the user's profile data in relative real-time through a question transformation user interface screen that includes a question quality indicator, such as, but not limited to, a question quality score, meter, or other visual or audio aide. In various embodiments, the question quality indicator provides the user with relatively real time feedback regarding the quality of the question being submitted as question data representing the question is being submitted and/or modified.

As a specific illustrative example, in one embodiment, an asking user's question data is parsed and analyzed at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 as it is being entered into the question and answer based customer support system using pre-question submission analysis of the attributes, subject matter, and format of the question itself, and/or user historical data, and/or user profile data. If the question is determined to be an improperly formatted question because the question is a general knowledge/open-ended type/format question, then at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 the asking user is provided format transformation/question reformation instructions, in one embodiment, generated based in part on the user historical data, and/or user profile data, that guide the user through a step-by-step process to transform the identified general knowledge/open-ended format question into a properly formatted question having a high quality question format, such as, for example, a closed-ended question format, capable of being answered with a simple "yes" or "no", or a closed-ended question format capable of being answered via multi-choice, or mapping.

In one embodiment, the step-by-step transformation process implemented using the format transformation/question reformation instructions is performed before any support resources are allocated to the improperly formatted questions, e.g., before the improperly formatted questions are forwarded/provided to the support community, and before any support resources are devoted to answering the improperly formatted questions, and before any support resources are devoted to actually trying to answer the improperly formatted question. In one embodiment, the step-by-step transformation process is presented to the user through a question transformation user interface screen that includes a question quality indicator such as, but not limited to, a question quality score or meter so that the user is provided with relatively real time feedback regarding the quality of the question being submitted as question data representing the question is being modified in accordance with the format transformation/question reformation instructions.

As another specific illustrative example, in one embodiment, an asking user's question data is parsed and analyzed at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 as it is being entered into the question and answer based customer support system using pre-question submission analysis of the attributes, subject matter, and format of the question itself, and/or user historical data, and/or user profile data.

If the question is determined to be an improperly formatted question because the question is a general knowledge/open-ended type/format question, then at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 the asking user is provided format transformation/question reformation instructions, in one embodiment, generated based in part on the user historical data, and/or user profile data, that guide the user through a step-by-step process to transform the identified general knowledge/open-ended format question into the most highly rated general knowledge/open-ended format in order of effectiveness (see FIG. 1A), i.e.: "Where" type/format questions, "What" type/format questions, "When" type/format questions, "Who" type/format questions, and "How" type/format questions.

In one embodiment, the step-by-step transformation process is presented to the user through a question transformation user interface screen that includes a question quality indicator such as, but not limited to, a question quality score or meter so that the user is provided with relatively real time feedback regarding the quality of the question being submitted as question data representing the question is being modified in accordance with the format transformation/question reformation instructions.

As another specific illustrative example, in one embodiment, an asking user's question data is parsed and analyzed at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 as it is being entered into the question and answer based customer support system using pre-question submission analysis of the attributes, subject matter, and format of the question itself, and/or user historical data, and/or user profile data.

If the question is determined to be an improperly formatted question because the question is in a low quality rhetorical, or an otherwise "unanswerable", question format, then at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 the asking user is provided format transformation/question reformation instructions, in one embodiment, generated based in part on the user historical data, and/or user profile data, that guide the user through a step-by-step process to transform the identified rhetorical, or unanswerable, improperly formatted question into a properly formatted question in a high quality question format, such as, for example, a closed-ended question, capable of being answered with a simple "yes" or "no", or a closed-ended question capable of being answered by multi-choice, or mapping. In one embodiment, the format transformation/question reformation instructions are used to implement the step-by-step transformation process before the question is submitted to the question and answer based customer support system for response, and before any support resources are actually devoted to trying to answer the improperly formatted question.

In one embodiment, the step-by-step transformation process is presented to the user through a question transformation user interface screen that includes a question quality indicator such as, but not limited to, a question quality score or meter so that the user is provided with relatively real time feedback regarding the quality of the question being submitted as question data representing the question is being modified in accordance with the format transformation/question reformation instructions.

As another specific illustrative example, in one embodiment, an asking user's question data is parsed and analyzed at BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA, ANALYZE THE QUESTION DATA TO DETERMINE IF THE QUESTION DATA REPRESENTS AN IMPROPERLY OR PROPERLY FORMATTED QUESTION OPERATION 319 as it is being entered into the question and answer based customer support system using pre-question submission analysis of the attributes, subject matter, and format of the question itself, and/or user historical data, and/or user profile data. If the question is determined to be an improperly formatted question because the question or query is determined to be in a low quality grammatically incorrect question or search query format, then at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321 the asking user is provided format transformation/question reformation instructions, in one embodiment, generated based in part on the user historical data, and/or user profile data, that guide the user through a step-by-step process to transform the improperly formatted question into a properly formatted question having a high quality grammatically correct format.

In various embodiments, the format transformation/question reformation instructions are provided to the user through multiple question asking experience question transformation interface screens used to incrementally direct users towards transforming improperly formatted questions into properly formatted closed-ended questions. Illustrative examples of question transformation user interface screens are shown in FIGS. 2A, 2B, 2C, 2D, 2E, and 2F and are discussed separately above.

Figure 4A:
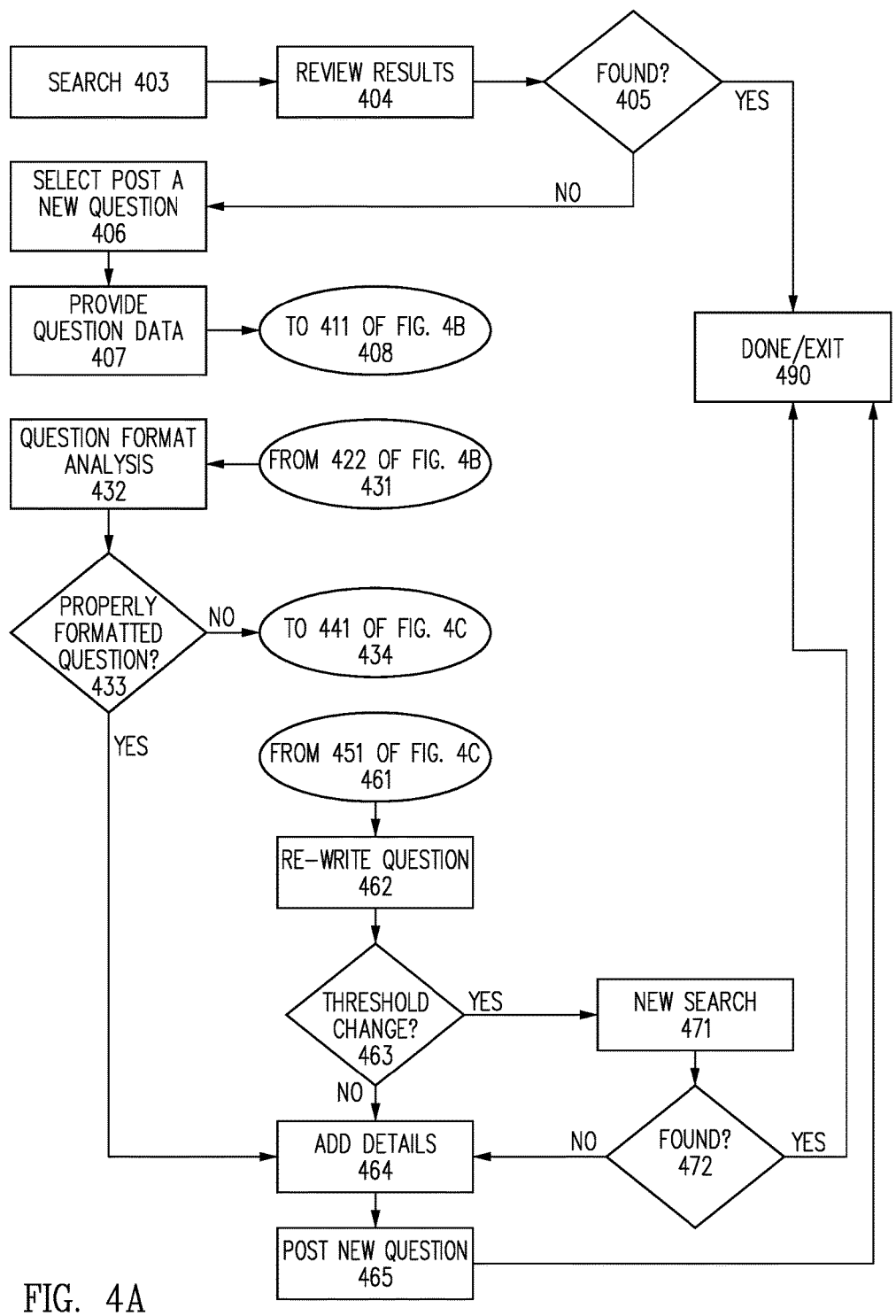
FIGS. 4A, 4B, and 4C together are a block diagram depicting a question analysis and reformation process for using format transformation/question reformation instructions to transform an improperly formatted question into a properly formatted question in accordance with one embodiment.
Figure 4B:
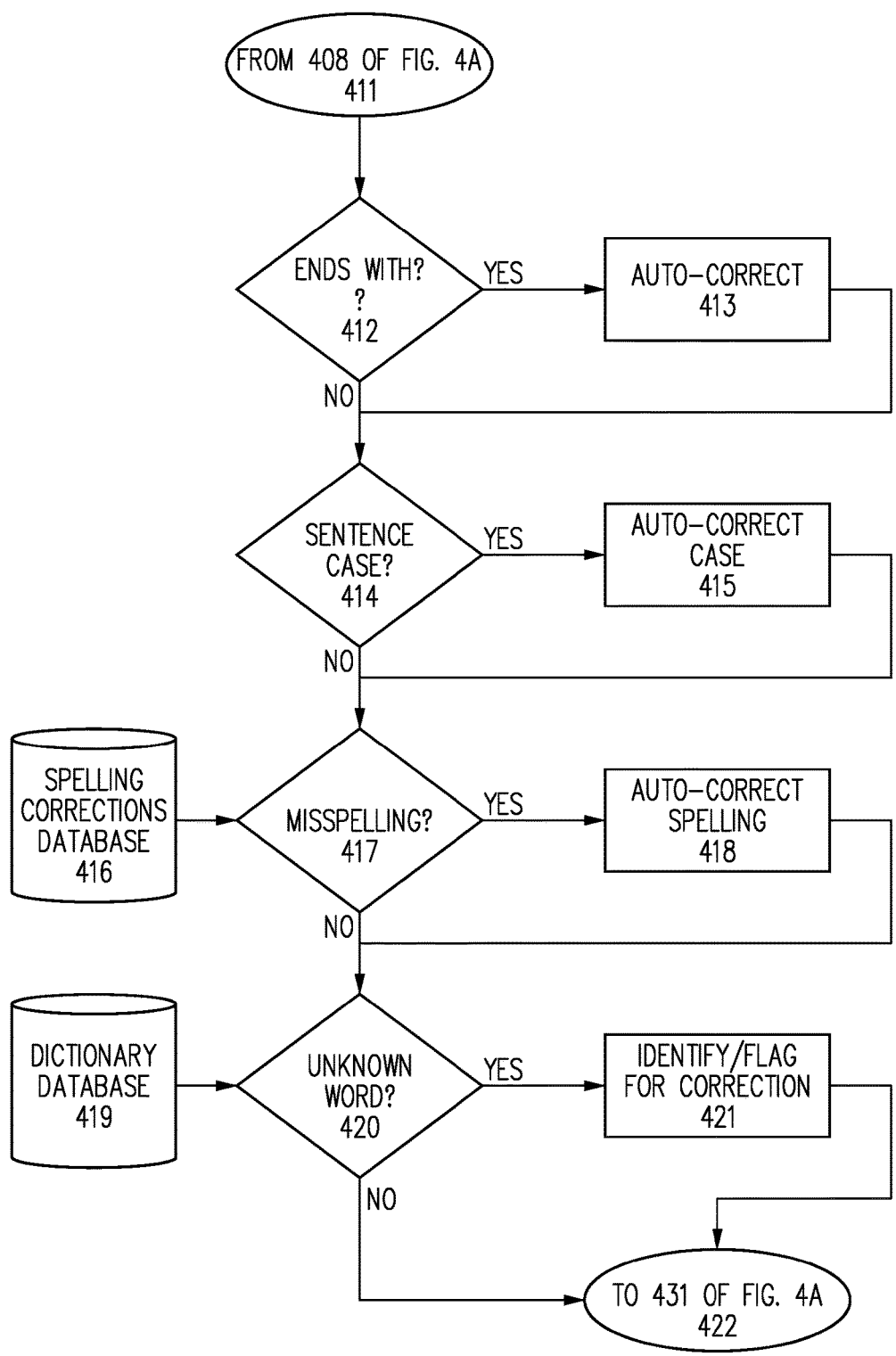
Figure 4C:
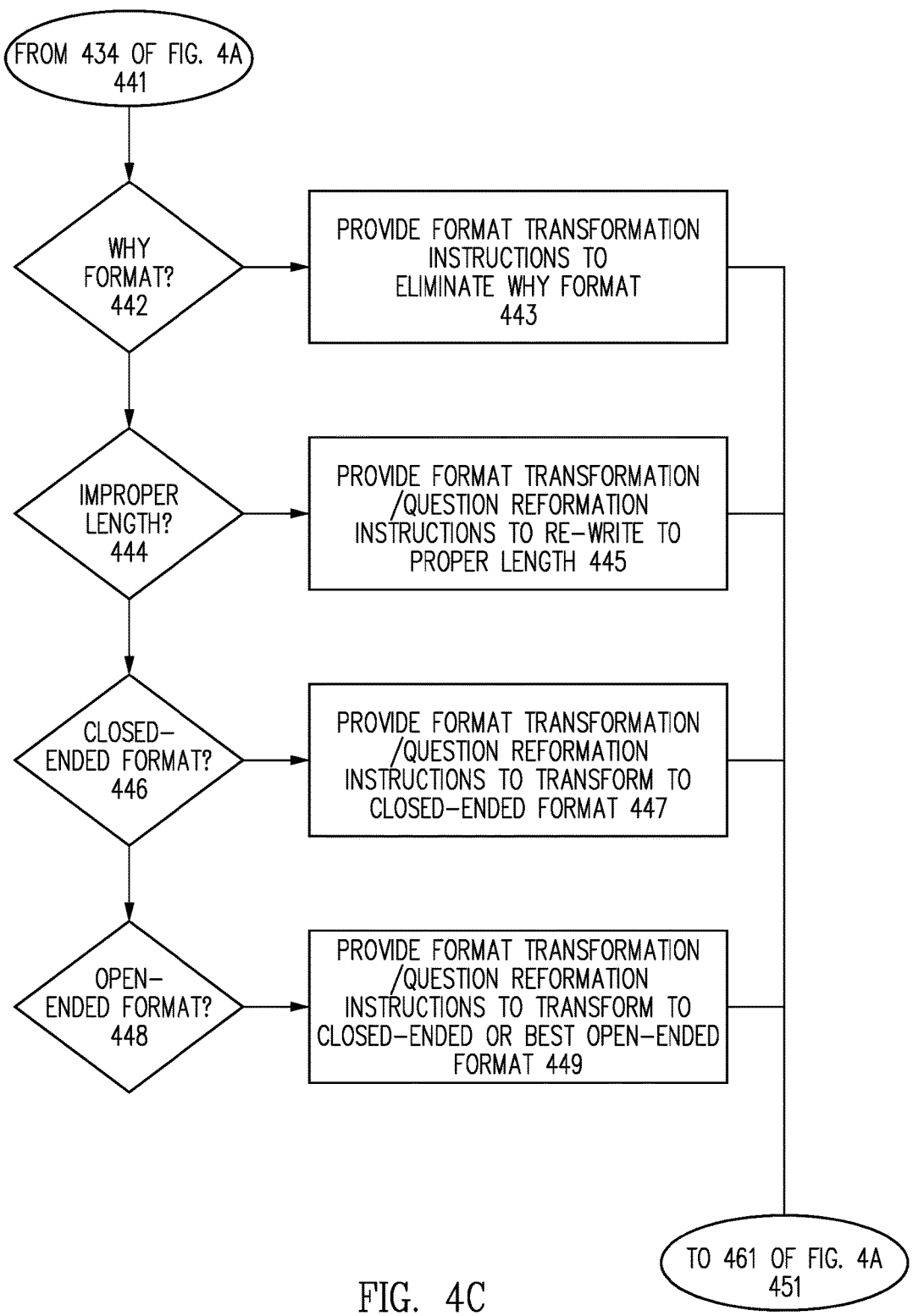

FIGS. 4A, 4B, and 4C together are a block diagram depicting a question analysis and reformation process for using format transformation/question reformation instructions to transform an improperly formatted question into a properly formatted question in accordance with one embodiment.

In one embodiment, once a software system, a question and answer based customer support system, and a customer support question and answer database are provided as discussed above with respect to FIG. 3 and process 300 for allocating support resources to a question based on analysis of the question content and predicted user satisfaction with answer content before the answer content is generated, searching users of the software system are provided the capability search the customer support question and answer database to find question and answer data related to a topic or question of interest to the searching user.

Referring to FIG. 4A, at SEARCH BLOCK 403 a searching user submits search query data to search the customer support question and answer database to find question and answer data related to the searching users topic or question of interest. In one embodiment, results data representing the results of the search query are provided to the searching user at REVIEW RESULTS BLOCK 404.

In one embodiment, at REVIEW RESULTS BLOCK 404 results data representing the results of the searching user's search of SEARCH BLOCK 403 are presented to the searching user and a determination is made at FOUND? BLOCK 405 as to whether the search results address the searching user's topic and/or answer the searching user's question.

In one embodiment, if at FOUND? BLOCK 405 a determination is made that the results of REVIEW RESULTS BLOCK 404 do address the searching user's topic and/or answer the searching user's question, then process flow moves directly to DONE/EXIT BLOCK 490.

In one embodiment, if at FOUND? BLOCK 405 a determination is made that the results of REVIEW RESULTS BLOCK 404 do not address the searching user's topic and/or answer the searching user's question, then process flow proceeds to SELECT POST A NEW QUESTION BLOCK 406.

In one embodiment, at SELECT POST A NEW QUESTION BLOCK 406 the searching user initiates the question submission process and thereby becomes an asking user. In one embodiment, at SELECT POST A NEW QUESTION BLOCK 406 the now asking user is provided a question data entry interface screen through which the asking user can enter or provide question data at PROVIDE QUESTION DATA BLOCK 407.

In one embodiment, at PROVIDE QUESTION DATA BLOCK 407 the asking user begins entering question data representing a question being submitted on behalf of the asking user.

In one embodiment, once the question data is submitted by the asking user at PROVIDE QUESTION DATA BLOCK 407 process flow proceeds through TO 411 OF FIG. 4B BLOCK 408 of FIG. 4A to FROM 408 OF FIG. 4A BLOCK 411 of FIG. 4B where an initial check of the grammatical format of the question being submitted via the question data of PROVIDE QUESTION DATA BLOCK 407 is performed.

Referring to FIG. 4B, at ENDS WITH?? BLOCK 412 a determination is made as to whether the question represented by the question data of PROVIDE QUESTION DATA BLOCK 407 concludes a "?" symbol. If the question represented by the question data of PROVIDE QUESTION DATA BLOCK 407 includes a "?" symbol the question data is auto-corrected at AUTO-CORRECT? BLOCK 413.

Process flow then proceeds to SENTENCE CASE? BLOCK 414 and, if required, the sentence case of the question represented by the question data of PROVIDE QUESTION DATA BLOCK 407 is auto corrected at AUTO-CORRECT CASE BLOCK 415.

Process flow then proceeds to MISSPELLING? BLOCK 417 where the question represented by the question data of PROVIDE QUESTION DATA BLOCK 407 is compared with SPELLING CORRECTIONS DATABASE 416 and any known misspelled words are corrected at AUTO-CORRECT SPELLING BLOCK 418.

Process flow then proceeds to UNKNOWN WORD? BLOCK 420 where the question represented by the question data of PROVIDE QUESTION DATA BLOCK 407 is compared with DICTIONARY DATABASE 419 and any unknown words are identified, corrected, or flagged for correction, at IDENTIFY/FLAG FOR CORRECTION BLOCK 421.

Once the initial grammar analysis is performed as described above and shown in FIG. 4B, process flow proceeds from TO 431 OF FIG. 4A BLOCK 422 of FIG. 4B to FROM 422 OF FIG. 4B BLOCK 431 of FIG. 4A and trough to QUESTION FORMAT ANALYSIS BLOCK 432.

As discussed in more detail above, questions submitted to the question and answer based customer support system at PROVIDE QUESTION DATA BLOCK 407 can be structured/formatted in a variety of ways and these various question type/formats can vary significantly in quality, and more importantly, in the predicted user satisfaction with an answer, any answer, to the question.

As a specific illustrative example, questions submitted to the question and answer based customer support system at PROVIDE QUESTION DATA BLOCK 407 can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions;

and/or closed-ended questions, capable of being answered with a simple "yes" or "no", or via a multi-choice, or mapping.

As discussed above, each of these question structures is associated with a empirically calculated predictability that the answer to the question, whatever that answer may be, will be found satisfactory by the users, e.g., the asking user and/or searching users. As also discussed above, this discovery by the Inventors is leveraged to predict user satisfaction with answers that may eventually be provided through the question and answer based customer support system by performing pre-submission analysis of the type/format, and other attributes, of the question itself, rather than post question submission analysis of an answer provided in response to the question. This paradigm shifting approach to predicting user satisfaction with an answer based on the user's question alone, and before the answer is generated, is in direct contrast to prior art assumptions and approaches that focused on the answers provided through a question and answer based customer support system, and analysis performed after both the question and answer had already been formulated and provided to users.

In one embodiment, the analysis performed at QUESTION FORMAT ANALYSIS BLOCK 432, PROPERLY FORMATTED QUESTION? BLOCK 433, and via the process blocks of FIG. 4C discussed below, is based on an empiric question taxonomy taking into account one or more of, the question type/format, the question grammar structure, the type of anticipated answer, asker type, and various other factors, as discussed above with respect to FIG. 3.

In one embodiment, low quality question formats that are predicted to result in answers that will have user satisfaction ratings below a threshold level of user satisfaction are defined/identified at QUESTION FORMAT ANALYSIS BLOCK 432 and PROPERLY FORMATTED QUESTION? BLOCK 433 based on the empirical data obtained as discussed above and shown in FIG. 1A.

In one embodiment, process flow proceeds from QUESTION FORMAT ANALYSIS BLOCK 432 to PROPERLY FORMATTED QUESTION? BLOCK 433. In one environment, at PROPERLY FORMATTED QUESTION? BLOCK 433, a determination is made as to whether the question represented by the question data of PROVIDE QUESTION DATA BLOCK 407 is in the proper question format. In one embodiment, if the question represented by the question data of PROVIDE QUESTION DATA BLOCK 407 is determined to be in the proper question format at PROPERLY FORMATTED QUESTION? BLOCK 433, process flow proceeds to ADD DETAILS BLOCK 464.

In one embodiment, at ADD DETAILS BLOCK 464, if additional details regarding the question represented by the question data of PROVIDE QUESTION DATA BLOCK 407 are required, those details are requested, and provided. In one embodiment, once any required additional details regarding the question represented by the question data of PROVIDE QUESTION DATA BLOCK 407 are provided, process flow proceeds to POST NEW QUESTION BLOCK 465.

In one embodiment, at POST NEW QUESTION BLOCK 465 the question represented by the question data of PROVIDE QUESTION DATA BLOCK 407, and any required additional details, are posted in the customer support question and answer database and support resources are allocated to the question, e.g., the question is provided to one or more customer support personnel to be addressed and answered by one of the one or more customer support personnel. In one embodiment, once the question represented by the question data of PROVIDE QUESTION DATA BLOCK 407, and any required additional details, is posted in the customer support question and answer database, process flow proceeds to DONE/EXIT BLOCK 490.

On the other hand, in one embodiment if at PROPERLY FORMATTED QUESTION? BLOCK 433, a determination is made that the question represented by the question data of PROVIDE QUESTION DATA BLOCK 407 is not in the proper question format process flow proceeds to, TO 441 OF FIG. 4C BLOCK 434. In one embodiment, process flow then proceeds thorough TO 441 OF FIG. 4C BLOCK 434 of FIG. 4A to FIG. 4C and FROM 434 OF FIG. 4A BLOCK 441. In one embodiment, at FROM 434 OF FIG. 4A BLOCK 441 process flow proceeds to WHY FORMAT? BLOCK 442 and question formatting analysis is performed on the question data of PROVIDE QUESTION DATA BLOCK 407.

In one embodiment, at WHY FORMAT? BLOCK 442 a determination is made as to whether the question represented by the question data of PROVIDE QUESTION DATA BLOCK 407 is in the open-end general information "Why" format. As seen in FIG. 1A, "Why" type/format questions have a relatively low satisfaction rating of 56.3%. Consequently, in various embodiments, "Why" type/format questions would be defined at QUESTION FORMAT ANALYSIS BLOCK 432 and PROPERLY FORMATTED QUESTION? BLOCK 433 as low quality question formats. In one embodiment, any question format other than the closed-ended type/format questions is defined as a low quality question format at QUESTION FORMAT ANALYSIS BLOCK 432 and PROPERLY FORMATTED QUESTION? BLOCK 433.

In one embodiment, if at WHY FORMAT? BLOCK 442 a determination is made that the question represented by the question data of PROVIDE QUESTION DATA BLOCK 407 is in the open-end general information "Why" format, then format transformation/question reformation instructions are provided at PROVIDE FORMAT TRANSFORMATION/QUESTION REFORMATION INSTRUCTIONS TO ELIMINATE WHY FORMAT BLOCK 443 to guide the user through a process of reforming the question represented by the question data of PROVIDE QUESTION DATA BLOCK 407 into a non-"why format question.

In various embodiments, the format transformation/question reformation instructions are provided to the user through one or more question transformation user interface screens such as those shown in FIGS. 2A, 2B, 2C, 2D, 2E, and 2F as discussed separately above.

In one embodiment, since, as seen in FIG. 1A, the "Why" format questions have the lowest user satisfaction ratings, virtually any question format is preferred over the "Why" question format. Consequently, in one embodiment, the format transformation/question reformation instructions question transformation user interface screens employed at PROVIDE FORMAT TRANSFORMATION/QUESTION REFORMATION INSTRUCTIONS TO ELIMINATE WHY FORMAT BLOCK 443 are used to help the user transform the "Why" format question into any of the other question formats with the preferred order being, closed-ended, "Who" general knowledge/open-ended, "What" general knowledge/open-ended, "Where" general knowledge/open-ended, and "How" general knowledge/open-ended.

In one embodiment, once the "Why" formatted question is transformed into another question format at PROVIDE FORMAT TRANSFORMATION/QUESTION REFORMATION INSTRUCTIONS TO ELIMINATE WHY FORMAT BLOCK 443, process flow proceeds to TO 461 OF FIG. 4A BLOCK 451.

In one embodiment, if at WHY FORMAT? BLOCK 442 a determination is made that the question represented by the question data of PROVIDE QUESTION DATA BLOCK 407 is not in the open-end general information "Why" format, process flow proceeds to IMPROPER LENGTH? BLOCK 444.

In one embodiment, at IMPROPER LENGTH? BLOCK 444 a determination is made as to whether the question represented by the question data of PROVIDE QUESTION DATA BLOCK 407 is of the required length. In one embodiment, if at IMPROPER LENGTH? BLOCK 444 a determination is made that the question represented by the question data of PROVIDE QUESTION DATA BLOCK 407 is not of the required length, process flow proceeds to PROVIDE FORMAT TRANSFORMATION/QUESTION REFORMATION INSTRUCTIONS TO RE-WRITE TO PROPER LENGTH BLOCK 445. In one embodiment, at PROVIDE FORMAT TRANSFORMATION/QUESTION REFORMATION INSTRUCTIONS TO RE-WRITE TO PROPER LENGTH BLOCK 445 format transformation/question reformation instructions are provided to guide the user through a process of reforming the question represented by the question data of PROVIDE QUESTION DATA BLOCK 407 into a question of the proper length.

In various embodiments, the format transformation/question reformation instructions are provided to the user through one or more question transformation user interface screens such as those shown in FIGS. 2A, 2B, 2C, 2D, 2E, and 2F as discussed separately above.

In one embodiment, once the question represented by the question data of PROVIDE QUESTION DATA BLOCK 407 is transformed into a question of the proper length at PROVIDE FORMAT TRANSFORMATION/QUESTION REFORMATION INSTRUCTIONS TO RE-WRITE TO PROPER LENGTH BLOCK 445, process flow proceeds to TO 461 OF FIG. 4A BLOCK 451.

In one embodiment, if at IMPROPER LENGTH? BLOCK 444 a determination is made that the question represented by the question data of PROVIDE QUESTION DATA BLOCK 407 is of the proper length, process flow proceeds to CLOSED-ENDED FORMAT? BLOCK 446.

In one embodiment, at CLOSED-ENDED FORMAT? BLOCK 446 a determination is made as to whether the question represented by the question data of PROVIDE QUESTION DATA BLOCK 407 is in a closed-ended format. In one embodiment, if at CLOSED-ENDED FORMAT? BLOCK 446 a determination is made that the question represented by the question data of PROVIDE QUESTION DATA BLOCK 407 is not in a closed-ended format, process flow proceeds to PROVIDE FORMAT TRANSFORMATION/QUESTION REFORMATION INSTRUCTIONS TO TRANSFORM TO CLOSED-ENDED FORMAT BLOCK 447.

In one embodiment, at PROVIDE FORMAT TRANSFORMATION/QUESTION REFORMATION INSTRUCTIONS TO TRANSFORM TO IDEAL CLOSED-ENDED FORMAT BLOCK 447 format transformation/question reformation instructions are provided to guide the user through a process of reforming the question represented by the question data of PROVIDE QUESTION DATA BLOCK 407 into a question in the preferred closed-ended format.

As noted above, closed-ended type/format questions have a very high satisfaction rating of 85.9%. Consequently, in various embodiments, all questions of the closed-ended type/format are defined as properly formatted questions and any question in a question format other than the closed-ended format is defined as an improperly formatted question.

As noted above, most closed-ended category format questions are in the sub-category of "Yes/No" type questions. These "Yes/No" type questions are identified by the fact that they typically start with an auxiliary verb such as "Do", "Can", "Be." As also noted above, the second sub-category of closed-ended question format includes "Choice" type questions. These "Choice" type questions are identified by the fact that they generally start with an auxiliary verb and also contain the conjunction "or." In one embodiment, the "Yes/No" type closed-ended format questions are the most preferred closed-ended format.

In various embodiments, the format transformation/question reformation instructions are provided to the user through one or more question transformation user interface screens such as those shown in FIGS. 2A, 2B, 2C, 2D, 2E, and 2F as discussed separately above.

In one embodiment, once the question represented by the question data of PROVIDE QUESTION DATA BLOCK 407 is transformed into a closed-ended formatted question at PROVIDE FORMAT TRANSFORMATION/QUESTION REFORMATION INSTRUCTIONS TO TRANSFORM TO CLOSED-ENDED FORMAT BLOCK 447, process flow proceeds to TO 461 OF FIG. 4A BLOCK 451.

In one embodiment, if at CLOSED-ENDED FORMAT? BLOCK 446 a determination cannot be made that the question represented by the question data of PROVIDE QUESTION DATA BLOCK 407 is in the closed-end question format, process flow proceeds to OPEN-ENDED FORMAT? BLOCK 448.

In one embodiment, at OPEN-ENDED FORMAT? BLOCK 448, a determination is made as to whether the question represented by the question data of PROVIDE QUESTION DATA BLOCK 407 is in an open-ended format. In one embodiment, if at OPEN-ENDED FORMAT? BLOCK 448 a determination is made that the question represented by the question data of PROVIDE QUESTION DATA BLOCK 407 is in an open-ended format, process flow proceeds to PROVIDE FORMAT TRANSFORMATION/ QUESTION REFORMATION INSTRUCTIONS TO TRANSFORM TO CLOSED-ENDED OR BEST OPEN-ENDED FORMAT BLOCK 449.

In one embodiment, at PROVIDE FORMAT TRANSFORMATION/QUESTION REFORMATION INSTRUCTIONS TO TRANSFORM TO CLOSED-ENDED OR BEST OPEN-ENDED FORMAT BLOCK 449 format transformation/question reformation instructions are provided to guide the user through a process of reforming the question represented by the question data of PROVIDE QUESTION DATA BLOCK 407 into a question in the preferred closed-ended format, or at least a more preferred open-ended question format.

As seen in FIG. 1A, the general knowledge/open-ended category questions have different levels of user satisfaction ratings. However, none of the knowledge/open-ended category questions have user satisfaction ratings as high as the 85.9% user satisfaction rating of the closed-ended question format. Consequently, all questions of the closed-ended type/format are defined as properly formatted questions and any question in a question format other than the closed-ended format is defined as an improperly formatted question. As a result, if at OPEN-ENDED FORMAT? BLOCK 448 a determination is made that the question represented by the question data of PROVIDE QUESTION DATA BLOCK 407 is in an open-ended format, format transformation/ question reformation instructions are provided at PROVIDE FORMAT TRANSFORMATION/QUESTION REFORMATION INSTRUCTIONS TO TRANSFORM TO CLOSED-ENDED OR BEST OPEN-ENDED FORMAT BLOCK 449 to attempt to guide the user through a process of reforming the question represented by the question data of PROVIDE QUESTION DATA BLOCK 407 into a question in the preferred closed-ended format. As noted above, the "Yes/No" type closed-ended format questions are the most preferred closed-ended format.

However, in some cases, the goal of reforming the question represented by the question data of PROVIDE QUESTION DATA BLOCK 407 into a question in the preferred closed-ended format is not attainable. In these instances, if at OPEN-ENDED FORMAT? BLOCK 448 a determination is made that the question represented by the question data of PROVIDE QUESTION DATA BLOCK 407 is in an open-ended format, format transformation/question reformation instructions are provided at PROVIDE FORMAT TRANSFORMATION/QUESTION REFORMATION INSTRUCTIONS TO TRANSFORM TO CLOSED-ENDED OR BEST OPEN-ENDED FORMAT BLOCK 449 to attempt to guide the user through a process of reforming the question represented by the question data of PROVIDE QUESTION DATA BLOCK 407 into a question in the best open-ended question format that can be attained.

To this end, in one embodiment, general knowledge/open-ended category questions submitted are identified. As noted above, general knowledge/open-ended category questions are of the form "Who," "What," "Where," "When," "How," and "Why" formatted questions. Consequently, in one embodiment, the question data is analyzed to detect these terms, or their functional equivalents.

In one embodiment, then format transformation/question reformation instructions are provided at PROVIDE FORMAT TRANSFORMATION/QUESTION REFORMATION INSTRUCTIONS TO TRANSFORM TO CLOSED-ENDED OR BEST OPEN-ENDED FORMAT BLOCK 449 to attempt to guide the user through a process of reforming the question represented by the question data of PROVIDE QUESTION DATA BLOCK 407 into a question in the best open-ended question format that can be attained with the preferred order being, closed-ended, "Who" general knowledge/open-ended, "What" general knowledge/open-ended, "Where" general knowledge/open-ended, and "How" general knowledge/open-ended.

In various embodiments, the format transformation/question reformation instructions are provided to the user through one or more question transformation user interface screens such as those shown in FIGS. 2A, 2B, 2C, 2D, 2E, and 2F as discussed separately above.

In one embodiment, once the question represented by the question data of PROVIDE QUESTION DATA BLOCK 407 is transformed into a closed-ended formatted question, or at least a more preferred open-ended question format question, at PROVIDE FORMAT TRANSFORMATION/QUESTION REFORMATION INSTRUCTIONS TO TRANSFORM TO CLOSED-ENDED OR BEST OPEN-ENDED FORMAT BLOCK 449, process flow proceeds to TO 461 OF FIG. 4A BLOCK 451.

In one embodiment, once the question format analysis of FIG. 4C, and WHY FORMAT? BLOCK 442, IMPROPER LENGTH? BLOCK 444, CLOSED-ENDED FORMAT? BLOCK 446, and OPEN-ENDED FORMAT? BLOCK 448 is complete, process flow proceeds through TO 461 OF FIG. 4A BLOCK 451 of FIG. 4C to FROM 451 OF FIG. 4C BLOCK 461 of FIG. 4A, and RE-WRITE QUESTION BLOCK 462.

In on embodiment, at RE-WRITE QUESTION BLOCK 462 the question represented by the question data of PROVIDE QUESTION DATA BLOCK 407 is rewritten in accordance with the procedures and guidance of the sub-processes of FIG. 4B and FIG. 4C discussed above. In one embodiment, the rewriting of the question represented by the question data of PROVIDE QUESTION DATA BLOCK 407 is analyzed at RE-WRITE QUESTION BLOCK 462 and if a threshold change in the question represented by the question data of PROVIDE QUESTION DATA BLOCK 407 is detected at THRESHOLD CHANGE? BLOCK 463, then the question represented by the question data of PROVIDE QUESTION DATA BLOCK 407 is determined to be a de facto new question. Consequently, a second search of the customer support question and answer database is conducted at NEW SEARCH BLOCK 471 using the rewritten question data.

In one embodiment, if, as a result of the new search of the customer support question and answer database using the using the rewritten question data at NEW SEARCH BLOCK 471 results data addressing the topic of the using the rewritten question data are received FOUND? BLOCK 472, then process flow proceeds to DONE/EXIT BLOCK 490.

In one embodiment, if, as a result of the new search of the customer support question and answer database using the using the rewritten question data at NEW SEARCH BLOCK 471 results data addressing the topic of the using the rewritten question data are not received FOUND? BLOCK 472, then process flow proceeds to ADD DETAILS BLOCK 464.

In one embodiment, if a threshold change in the question represented by the question data of PROVIDE QUESTION DATA BLOCK 407 is not detected, then process flow proceeds to ADD DETAILS BLOCK 464. In one embodiment, at ADD DETAILS BLOCK 464, if additional details regarding the question represented by the question data of PROVIDE QUESTION DATA BLOCK 407 are required, those details are requested, and provided. In one embodiment, once any required additional details regarding the question represented by the question data of PROVIDE QUESTION DATA BLOCK 407 are provided, process flow proceeds to POST NEW QUESTION BLOCK 465.

In one embodiment, at POST NEW QUESTION BLOCK 465 the question represented by the question data of PROVIDE QUESTION DATA BLOCK 407, and any required additional details, are posted in the customer support question and answer database and support resources are allocated to the question, e.g., the question data is provided to one or more customer support personnel to be addressed and answered by one of the one or more customer support personnel. In one embodiment, once the question represented by the question data of PROVIDE QUESTION DATA BLOCK 407, and any required additional details, is posted in the customer support question and answer database, process flow proceeds to DONE/EXIT BLOCK 490.

Returning to FIG. 3, in one embodiment, when, and if, an improperly formatted question and the undesirable question data is transformed into a properly formatted question and desirable question data at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321, the now properly formatted question and desirable question data is allocated support resources, such as, but not limited to, the time of volunteer and professional agent support personnel of a support community, on a high priority basis in an effort to provide answer content to both the asking user and/or searching users, through a customer support question and answer database, on a high priority basis.

In one embodiment, once one or more corrective actions are performed on identified improperly formatted questions at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321, process flow proceeds to IF A DETERMINATION IS MADE THAT THE QUESTION DATA REPRESENTS A PROPERLY FORMATTED QUESTION, ALLOCATE SUPPORT RESOURCES TO THE QUESTION DATA FOR THE PURPOSE OF PROVIDING AN ANSWER TO THE QUESTION REPRESENTED BY THE QUESTION DATA ON A PRIORITY BASIS OPERATION 323.

In one embodiment, in contrast to the processing of improperly formatted questions at IF A DETERMINATION IS MADE THAT THE QUESTION DATA REPRESENTS AN IMPROPERLY FORMATTED QUESTION, TAKE ONE OR MORE CORRECTIVE ACTIONS BEFORE ALLOCATING SUPPORT RESOURCES TO THE QUESTION DATA FOR THE PURPOSE OF PROVIDING AN ANSWER TO THE QUESTION REPRESENTED BY THE QUESTION DATA OPERATION 321, if, based on the analysis of the entered question data using the format analysis instructions required to identify the low quality question formats generated and stored as discussed above, and/or the format analysis instructions required to identify the high quality question formats generated and stored as discussed above, and/or the user historical data, and/or the user profile data, the question represented by the question data submitted is determined to be a properly formatted question, then at IF A DETERMINATION IS MADE THAT THE QUESTION DATA REPRESENTS A PROPERLY FORMATTED QUESTION, ALLOCATE SUPPORT RESOURCES TO THE QUESTION DATA FOR THE PURPOSE OF PROVIDING AN ANSWER TO THE QUESTION REPRESENTED BY THE QUESTION DATA ON A PRIORITY BASIS OPERATION 323 the question represented by the question data submitted is allocated support resources, such as, but not limited to, the time of volunteer and professional agent support personnel of a support community, on a high priority basis in an effort to provide answer data to both the asking user and/or searching users, through a customer support question and answer database, on a high priority basis, i.e., as soon as possible.

In one embodiment, only when all properly formatted question have been allocated support resources, such as, but not limited to, the time of volunteer and professional agent support personnel of a support community, at IF A DETERMINATION IS MADE THAT THE QUESTION DATA REPRESENTS A PROPERLY FORMATTED QUESTION, ALLOCATE SUPPORT RESOURCES TO THE QUESTION DATA FOR THE PURPOSE OF PROVIDING AN ANSWER TO THE QUESTION REPRESENTED BY THE QUESTION DATA ON A PRIORITY BASIS OPERATION 323, are any improperly formatted questions allocated support resources, such as, but not limited to, the time of volunteer and professional agent support personnel of a support community.

In one embodiment, once the question data submitted is determined to be a properly formatted question and the question represented by the question data submitted is allocated support resources, such as, but not limited to, the time of volunteer and professional agent support personnel of a support community, on a high priority basis at IF A DETERMINATION IS MADE THAT THE QUESTION DATA REPRESENTS A PROPERLY FORMATTED QUESTION, ALLOCATE SUPPORT RESOURCES TO THE QUESTION DATA FOR THE PURPOSE OF PROVIDING AN ANSWER TO THE QUESTION REPRESENTED BY THE QUESTION DATA ON A PRIORITY BASIS OPERATION 323, process flow proceeds to EXIT OPERATION 330.

In one embodiment, at EXIT OPERATION 330 process 300 for allocating support resources to a question based on analysis of the question content and predicted user satisfaction with answer content before the answer content is generated is exited to await new data.

Figure 5:
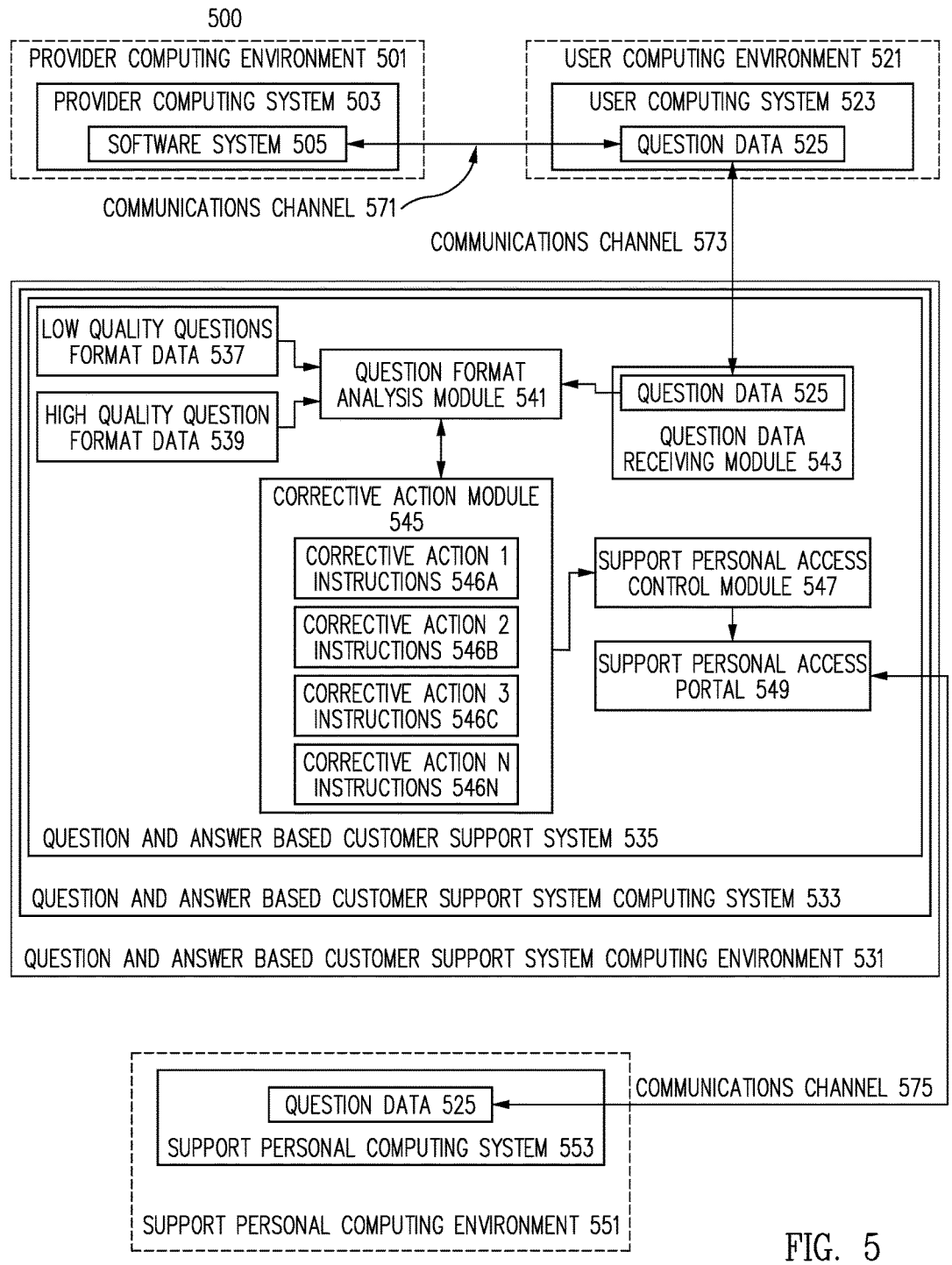
FIG. 5 is a block diagram of a hardware and production environment system 500 for providing a process for allocating support resources to a question based on analysis of the question content and predicted user satisfaction with answer content before the answer content is generated in accordance with one embodiment.

FIG. 5 is a block diagram of a hardware and production environment system 500 for providing a process for allocating support resources to a question based on analysis of the question content and predicted user satisfaction with answer content before the answer content is generated in accordance with one embodiment.

As seen in FIG. 5, in one embodiment, a provider computing system 503 is provided in provider computing environment 501 and includes software system 505. In various embodiments, software system 505 is any software system discussed herein, known at the time of filing, and/or as developed after the time of filing.

As also seen in FIG. 5, user computing system 523 is provided in user computing environment 521. In one embodiment, a user of software system 505 accesses provider computing system 503 and software system 505 via communications channel 571.

In one embodiment, the users of software system 505 are also provided a question and answer based customer support system 535 shown as implemented on question and answer based customer support system computing system 533 in question and answer based customer support system computing environment 531.

In one embodiment, through question and answer based customer support system 535, users can submit question data 525 via communications channel 573. In one embodiment, question data 525 entered by the users represents questions to be potentially be provided to one or more support personnel associated with question and answer based customer support system 535. In one embodiment, question data 525 is submitted by the users so that the questions represented by question data 525 can be potentially be answered by at least one of the one or more support personnel associated with support personnel computing system 553 shown as implemented in support personnel computing environment 551.

In one embodiment, low quality question formats that are predicted to result in answers that will have user satisfaction ratings below a threshold level of user satisfaction are defined/identified and recorded in low quality format question data 537. In one embodiment, any identified questions submitted via question data 525 in any of the low quality question formats of low quality format question data 537 are defined/labeled as improperly formatted questions.

Alternatively, in one embodiment, high quality question formats that are predicted to result in answers that will have user satisfaction ratings above a threshold level of user satisfaction are defined/identified and recorded in high quality format question data 539. In one embodiment, any identified questions submitted via question data 525 in any of the high quality question formats of high quality format question data 539 are defined/labeled as properly formatted questions.

In one embodiment, when question data 525 representing a question submitted by a user through question and answer based customer support system 535 is being entered by a user, and/or is otherwise received by question and answer based customer support system 535 at question data receiving module 543 communications channel 573, question data 525 is parsed and analyzed by question format analysis module 541 using low quality format question data 537 and/or high quality format question data 539 before providing question data 525 to any of the one or more support personnel at support personnel computing system 553 to answer to the question represented by question data 525 to determine if question data 525 represents an improperly formatted question.

In one embodiment, if, based on the analysis of question data 525 at question format analysis module 541, a determination is made that question data 525 represents an improperly formatted question, one or more corrective actions are implemented by corrective action module 545.

In one embodiment, the one or more corrective actions are implemented by corrective action module 545 using one or more of, corrective action 1 instructions 546A, corrective action 2 instructions 546B, corrective action 3 instructions 546C, through corrective action N instructions 546N, before providing the question data 525 to support personnel access module 547, support personnel access portal 549, and the support personnel computing system 553 via communications channel 575, to answer the question represented by question data 525.

In one embodiment, the one or more corrective actions taken before providing the question data to the one or more support personnel of corrective action module 545 includes filtering out the improperly formatted question before the improperly formatted question is provided to the support community, and before any support resources are devoted to answering the improperly formatted question.

In one embodiment, the one or more corrective actions taken before providing the question data to the one or more support personnel of corrective action module 545 includes refusing to accept submission of the improperly formatted question before the improperly formatted question is provided to the support community, and before any support resources are devoted to answering the improperly formatted question.

In one embodiment, the one or more corrective actions taken before providing the question data to the one or more support personnel of corrective action module 545 includes attempting to correct the improperly formatted question by providing the user with a set of format transformation/question reformation instructions used to transform the improperly formatted question into a properly formatted question as discussed herein.

Consequently, improperly formatted questions of question data 525 submitted to question and answer based customer support system 535 are identified before the questions are submitted to support personnel computing system 553, and/or any support personnel, for the purpose of providing an answer to the question, and before any support resources are expended in an attempt to answer the improperly formatted question. In addition, improperly formatted questions are identified before any users, including the asking user, are provided answers to improperly formatted questions that are likely to result in low user satisfaction ratings.

As noted above, a customer support question and answer database is a critical, if not the most important, feature of a question and answer based customer support system. This is because there is, by definition, a finite number of support resources, such as, for example, support personal, either volunteers or professionals, and, therefore, there is a limit to the amount of support resources, such as support person-hours, available at any time to answer user questions. Consequently, it is important to utilize support resources, such as a support community, efficiently to answer not only just new questions, and thereby avoid redundant efforts, but to answer questions that are likely to result in satisfied users first, as opposed to questions that are unlikely to satisfy either the asking user or subsequent searching users.

Using processes 300 and/or 400, and system 500, as disclosed herein, satisfaction with the answers provided through a question and answer based customer support system are predicted before the question is formally submitted to the question and answer based customer support system. Therefore, using processes 300 and/or 400, and system 500, as disclosed herein, methods and systems are provided to reliably, efficiently, and proactively predict user satisfaction with a potential answer to a user's question and then route and prioritize the user's question to support resources, such as volunteer and/or professional agent support personnel of a support community, such that those questions predicted to result in high user satisfaction with any answer data generated are provided to the support resources, such as the proper support personnel, in a priority manner, while those questions predicted to result in low user satisfaction with any answer data generated are subjected to one or more corrective actions before being submitted to any support resources, such as support personnel, or are at least given a lower priority for submission to the support resources, such as proper support personnel.

In this way, the satisfaction of asking and/or searching users with question and answer pair data to be potentially provided through the question and answer based customer support system can be predicted to ensure support resources, such as the time and energy of support personnel, are utilized most efficiently and the resulting question and answer pair data is of the highest quality/value.

The disclosed method and system for allocating support resources to a question based on analysis of the question content and predicted user satisfaction with answer content before the answer content is generated of processes 300 and/or 400, and system 500, as disclosed herein, provides for significant improvements to the technical fields of customer support, information dissemination, software implementation, and user experience. In addition, using processes 300 and/or 400, and system 500, as disclosed herein, results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing processes 300 and/or 400, and system 500, as disclosed herein.

The various embodiments of the disclosure can be implemented to improve the technical fields of customer support, information dissemination, software implementation, and user experience. Therefore, the various described embodiments of the disclosure and their associated benefits amount to significantly more than an abstract idea.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for allocating support resources to a question based on analysis of the question content and predicted user satisfaction, based on that analysis of the question content, with answer content before the answer content is generated, the method comprising:
providing users of a software system a question and answer based customer support system through which question data can be entered by the users, the question data representing questions to potentially be provided to one or more support resources associated with the question and answer based customer support system so that the questions represented by the question data can be answered via answer data generated using the support resources;

receiving question data representing a question submitted by the user through the question and answer based customer support system;

obtaining user question data, user historical data and user profile data, and once the user question data, user historical data and user profile data is obtained, the user question data, user historical data and user profile data is shared with, or linked to, two or more software system used by the user;

analyzing, before allocating any support resources to generating answer data related to the question data, the question data, user historical data, and user profile data to determine, based on whether the question data represents a question that is expected to have an answer that will result in a greater than threshold level of user satisfaction or instead alternatively represents a question type that is expected to have an answer that will result in a lower than threshold level of user satisfaction, the analysis being performed by:

parsing, before allocating any support resources to generating answer data related to the question data, the received question data to determine interrogative pronouns of the question data;

mapping, before allocating any support resources to generating answer data related to the question data and using user historical data and user profile data, the determined interrogative pronouns to a question category;

determining, based on the question category, whether the question data represents a question category that is expected to have an answer that will result in a greater than threshold level of user satisfaction or alternatively whether the question data represents a question category that is expected to have an answer that will result in a lower than threshold level of user satisfaction; and if, based on the analysis of the question data, a determination is made that the question data represents a question category that is expected to have an answer that will result in a greater than threshold level of user satisfaction, allocating support resources to generating answer data related to the question data;

if, based on the analysis of the question data, a determination is made that the question data represents question category that is expected to have an answer that will result in a lower than threshold level of user satisfaction, taking corrective action with the user to assist the user in reforming the question represented by the question data, the corrective action being customized for the user through the consideration of user attributes identified using the user's own question data, historical data and user profile data.

2. The method claim 1 wherein the software system is selected from the group of software systems consisting of:
a computing system implemented tax preparation software system;
a network accessed tax preparation software system;
a web-based tax preparation software system;
a cloud-based tax preparation software system;
a computing system implemented business management software system;
a network accessed business management software system;
a web-based business management software system;
a cloud-based business management software system;
a computing system implemented accounting software system;
a network accessed accounting software system;
a web-based accounting software system;
a cloud-based accounting software system;
a computing system implemented financial management system;
a network accessed financial management system;
a web-based financial management system; and
a cloud-based financial management system.

3. The method of claim 1 further comprising:
before allocating support resources to generating answer data related to the question data, analyzing the question data to determine what type of question is represented by the question data; and
based on the determined type of question represented by the question data, identifying the type of support resources to which the question should be routed.

4. The method of claim 1 wherein the question and answer based customer support system includes a web-based question and answer forum associated with the software system and/or an area of endeavor of the software system.

5. The method of claim 1 wherein the support resources include a support community of support personnel for the software system.

6. The method of claim 5 wherein the support community of support personnel for the software system includes volunteer support personnel that are part of a support community for the software system and professional agent support personnel that are part of a support community for the software system.

7. The method of claim 6 further comprising:
before allocating support resources to generating answer data related to the question data, analyzing the question data to determine what type of question is represented by the question data;
if the question is identified as a question directed to the subject matter and area of endeavor of the software system, routing the question to the volunteer support personnel of a support community for the software system; and
if the question is identified as a question directed to the software system product, routing the question to the professional agent support personnel that are part of a support community for the software system.

8. The method of claim 6 wherein the question and answer based customer support system includes a customer support question and answer database, the customer support question and answer database including question and answer pair data representing one or more questions submitted by asking users of the software system and the answers to those questions generated using the support resources for the software system, further wherein;
the question and answer pair data in the customer support question and answer database can be searched and accessed by searching users of the software system.

9. The method of claim 1 wherein the question data is submitted by asking users of the software system through question data submission interfaces provided through the question and answer based customer support system, the question data submission interfaces including one or more question data entry fields to enter the question data, the question data to be parsed and analyzed before being allocated any of the support resources to determine if the question data represents an improperly formatted question.

10. The method of claim 1 wherein low quality question formats that are predicted to result in answers that will have user satisfaction ratings below a threshold level of user satisfaction include:

"Who" question formats;
"What" question formats;
"When" question formats;
"Where" question formats;
"Why" question formats;
"How" question formats;
rhetorical question formats;
grammatically incorrect question formats; and
ill-formed question formats.

11. The method of claim 1 wherein if, based on the analysis of the question data, a determination is made that the question data represents an improperly formatted question, the one or more corrective actions taken before allocating support resources to generating answer data related to the question data includes filtering out the improperly formatted question data before any support resources are allocated to generating answer data related to the question data.

12. The method of claim 1 wherein if, based on the analysis of the question data, a determination is made that the question data represents an improperly formatted question, the one or more corrective actions taken before allocating support resources to generating answer data related to the question data includes refusing to accept submission of the improperly formatted question data before any support resources are allocated to generating answer data related to the question data.

13. The method of claim 1 wherein if, based on the analysis of the question data, a determination is made that the question data represents an improperly formatted question, the one or more corrective actions taken before allocating support resources to generating answer data related to the question data includes attempting to correct the improperly formatted question data by providing the user with a set of format transformation/question reformation instructions used to transform the improperly formatted question data into a properly formatted question data before any support resources are allocated to generating answer data related to the question data.

14. The method of claim 13 wherein the user is provided the format transformation/question reformation instructions representing suggestions on how to re-phrase/reform the improperly formatted question data that are customized to the specific question data being submitted.

15. The method of claim 14 wherein if, based on the analysis of the question data, a determination is made that the question data represents an improperly formatted question because the question represented by the question data is a general knowledge/open-ended format question, the asking user is provided format transformation/question reformation instructions that guide the user through a step-by-step process to transform the identified general knowledge/open-ended improperly formatted question into properly formatted closed-ended question.

16. The method of claim 14 wherein if, based on the analysis of the question data, a determination is made that the question data represents an improperly formatted question because the question represented by the question data is in a low quality rhetorical, or otherwise "unanswerable", question format, the asking user is provided format transformation/question reformation instructions that guide the user through a step-by-step process to transform the identified rhetorical, or otherwise "unanswerable", improperly formatted question into properly formatted closed-ended question.

17. The method of claim 14 wherein if, based on the analysis of the question data, a determination is made that the question data represents an improperly formatted question because the question represented by the question data is in a grammatically incorrect question or search query format, the asking user is provided format transformation/question reformation instructions that guide the user through a step-by-step process to transform the identified grammatically incorrect question or search query improperly formatted question into a properly formatted closed-ended question.

18. The method of claim 14 wherein the user is provided the format transformation/question reformation instructions via a question transformation user interface screen.

19. The method of claim 18 wherein the question transformation user interface screen includes a question quality indicator.

20. The method of claim 18 wherein question transformation user interface screen is a question optimizer question transformation user interface screen.

21. The method of claim 18 wherein the user is provided the format transformation/question reformation instructions representing suggestions on how to re-phrase/reform the improperly formatted question through the question optimizer question transformation user interface screen as the question data is being submitted.

* * * * *